(12) United States Patent
Fujiki

(10) Patent No.: US 6,823,413 B2
(45) Date of Patent: Nov. 23, 2004

(54) INTERRUPT SIGNAL PROCESSING APPARATUS

(75) Inventor: Yuji Fujiki, Tokyo (JP)

(73) Assignee: Oki Electronic Industry Co., Ltd., Tokyo (JP)

( * ) Notice: Subject to any disclaimer, the term of this patent is extended or adjusted under 35 U.S.C. 154(b) by 436 days.

(21) Appl. No.: 09/875,973

(22) Filed: Jun. 8, 2001

(65) Prior Publication Data

US 2002/0188785 A1 Dec. 12, 2002

(51) Int. Cl.$^7$ .............................................. G06F 13/24
(52) U.S. Cl. ......................... 710/260; 710/266; 710/48
(58) Field of Search ............................ 710/48, 52, 58, 710/60, 61, 65, 260, 263, 264, 265, 266; 713/600, 601

(56) References Cited

U.S. PATENT DOCUMENTS

| | | | | |
|---|---|---|---|---|
| 4,631,670 A | * | 12/1986 | Bradley et al. | 710/264 |
| 5,185,864 A | * | 2/1993 | Bonevento et al. | 710/48 |
| 5,448,715 A | * | 9/1995 | Lelm et al. | 713/600 |
| 6,345,328 B1 | * | 2/2002 | Rozario et al. | 710/52 |
| 6,356,963 B1 | * | 3/2002 | Maguire et al. | 710/48 |

\* cited by examiner

Primary Examiner—Khanh Dang
(74) Attorney, Agent, or Firm—Rabin & Berdo, P.C.

(57) ABSTRACT

An interrupt signal processing apparatus, when receiving an interrupt requesting signal from one device, writes a pulse signal generated by an interrupt setting pulse generating section to a register. The interrupt signal processing apparatus, when receiving an interrupt clearing request signal from the other device, clears the register by using a pulse signal fed from the interrupt clearing pulse generating section and outputs the interrupt permission signal to the one device. When a clock speed of the other device is lower than that of the one device and when pulse generation is controlled by a control signal fed from the clearing pulse generating section of the other device, while the pulse signal fed from the other device is input to the delay circuit, a time delay is provided to operations of the second synchronization section. Thus, smooth interruption can be implemented regardless of the clock speed.

22 Claims, 12 Drawing Sheets

INTERRUPT SIGNAL PROCESSING APPARATUS

BACKGROUND OF THE INVENTION

1. Field of the Invention

The present invention relates to an interrupt signal processing apparatus connected between two processing devices each operating on an operation clock having a different clock speed, which is adapted to perform processing in response to an interrupt request signal.

2. Description of the Related Art

An information processing device such as a personal computer generally uses a plurality of arithmetic computing devices which operates on operation clocks each having a different clock speed in order to improve its performance and to reduce power consumption. Such arithmetic computing devices include, for example, a main arithmetic computing device called a main processor used to entirely control information processing auxiliary arithmetic computing device called an auxiliary processor used to exclusively perform, for example, image processing.

There are some cases in which the main and auxiliary arithmetic computing devices make a request for interruptions to each other, when a signal requesting the interrupt processing is output from one arithmetic computing device to the other arithmetic computing device. As described above, since the one processing device and the other processing device operate on operation clocks each having a different clock speed, each of the processing devices has to perform interrupt processing in synchronization with these operation clocks.

In a conventional interrupt signal processing apparatus, for example, when the main processor operating on a high-speed clock generates an interruption to the auxiliary processor, to notify the generation of the interruption, an interrupt setting pulse signal using timing provided by the high speed clock on which the main processor operates is produced and set to a register. The interrupt signal processing apparatus outputs, based on the interrupt setting pulse signal set to the register, an interruption requesting signal using timing provided by the low speed clock on which the auxiliary processor operates, to the auxiliary processor. This causes the auxiliary processor to recognize the request for interruptions from the main processor.

Moreover, the interrupt signal processing apparatus, when receiving an interrupt clearing pulse signal notifying that the auxiliary processor has terminated the interruption processing in response to the interruption request from the auxiliary processor, produces an interrupt clearing pulse signal using the timing provided by the low speed clock on which the auxiliary processor operates and outputs it to the register in order to clear the register.

The interrupt signal processing apparatus, when the register is cleared, outputs an interrupt permission signal using the timing provided by the high speed clock to the main processor. This causes the main processor to recognize that a new interruption can be generated and to generate the new interruption if necessary.

By the interrupt signal processing apparatus, an interruption is generated from the one processing device operating on a high-speed clock to the other processing device operating on a low-speed clock.

In the interrupt signal processing apparatus, due to outputting of the interrupt permission signal, the interrupt clearing request signal is input from the processing device operating on the low speed clock, however, if the interrupt setting pulse from the processing device operating on the high speed clock is input while the interrupt clearing request signal is being input, a malfunction occurs due to the duplicate inputting of signals to the register in the interrupt signal processing apparatus. To avoid this malfunction, an interrupt setting priority function is provided which, by using an interrupt setting pulse signal being operated to control so as to stop outputting of the interrupt clearing pulse signal to the register using the timing provided by the high speed clock, controls the interrupt clearing pulse signal.

However, such the conventional interrupt signal processing apparatus has a problem. That is, since there is a difference in the clock speed between the two processing devices, the pulse signal to respond to the one processing device operating on the low-speed operation clock has to be controlled by the pulse signal to respond to the other processing device operating on the high-speed operation clock. Because of this, an interrupt signal processing device having the interrupt clearing priority function, which is the reverse of the interrupt setting priority function, is required to respond to a request for the interruption from the processing device operating on the low speed clock to the processing device operating on the high speed clock. Therefore, when the interruption between both the processing devices is to be generated by using the conventional interrupt signal processing apparatus, it is necessary to switch between the interrupt priority function and the interrupt clearing priority function by taking a relation in speeds of operation clocks into consideration.

SUMMARY OF THE INVENTION

In view of the above, it is an object of the present invention to provide an interrupt signal processing apparatus capable of implementing an interruption without considerations given to a difference in a clock speed between two processing devices. It is another object of the present invention to provide the interrupt signal processing apparatus capable of implementing the interruption without the need for a priority function switching mechanism and without the need for switching operations.

According to a first aspect of the present invention, there is provided an interrupt signal processing apparatus for processing a request for interruption from one device to the other device, connected between the one device and the other device, each being operated on either of a first clock and a second clock, including:

an interrupt setting pulse generating section, when receiving an interrupt requesting signal from the one device, generates an interrupt setting pulse signal by using timing provided by the first clock on which the one device is operated;

a register, when receiving the interrupt setting pulse signal, to store the interrupt setting pulse signal as a signal for interruption to the other device;

a first synchronization unit to output the interrupt signal fed from the register to the other device, in synchronization with the second clock on which the other device is operated;

an interrupt clearing pulse generating section, when receiving an interrupt clearing request signal from the other device which has received the interrupt signal through the synchronization section, to output an interrupt clearing pulse signal using timing provided by the second clock in order to reset the register used to store the interrupt signal;

a second synchronization section to output an interrupt permission signal, in synchronization with the first clock, to the one device, when the register has received the clearing pulse signal;

a control circuit provided between the interrupt setting pulse generating section and the interrupt clearing pulse generating section to control generation, using one pulse out of the interrupt setting pulse signal and the interrupt clearing pulse signal, of the other pulse out of the interrupt setting pulse and the interrupt clearing signal; and a delay circuit to provide, while the one pulse signal is being input to the register, a time delay to operations of the synchronization section being operated in synchronization with the clock on which the pulse generating section used to generate the other pulse signal is operated, in order to prevent duplicated inputting of the both pulse signals to the register.

In the foregoing, a preferable mode is one wherein each of the first and second clocks has a different clock speed.

Also, a preferable mode is one wherein a speed of the clock on which the pulse generating section to generate the one of the pulse signals is operated is lower than that of the clock on which the pulse generating section to generate the other of the pulse signals is operated and wherein the delay circuit provides a time delay being equivalent to a clock period of the low-speed clock to the synchronization section.

Also, a preferable mode is one wherein the register is made up of a flip-flop having a set terminal, a reset terminal and an output terminal in which an output signal is switched between two values by selective inputting of a signal to both terminals and wherein the interrupt setting pulse signal is input to the set terminal and the interrupt clearing pulse is input to the reset terminal and wherein an output signal from the output terminal is input to the both synchronization sections.

Also, a preferable mode is one wherein the control circuit, while the interrupt setting pulse signal is being input in the register, controls the interrupt clearing pulse generating section in order to stop generation of the interrupt clearing pulse generating section by the interrupt clearing pulse generating section and wherein the delay circuit, while the interrupt setting pulse signal is outputting from the interrupt setting pulse generating section, provides a time delay to the transmission of the interrupt signal fed from the register to the first synchronization section.

Also, a preferable mode is one wherein the control circuit, while the interrupt clearing pulse signal is being input to the register, controls the interrupt setting pulse generating section in order to stop the generation of the interrupt setting pulse signal and wherein the control circuit, while the interrupt clearing pulse signal is outputting from the interrupt clearing pulse generating section, provides a time delay to the transmission of an interrupt permission signal fed from the register to the second synchronization section.

Also, a preferable mode is one wherein the delay circuit is made up of a D flip-flop having a clock input terminal, data input terminal and output terminal and wherein the first clock is input to the clock input terminal and the interrupt permission signal fed from the register to the second synchronization section is input and the interrupt permission signal is output to the output terminal in synchronization with operations of the clock terminal.

Also, a preferable mode is one wherein the delay circuit is made up of a D flip-flop having a clock input terminal to which the second clock is input, a data input terminal to which the interrupt signal fed from the register to the first synchronization section is input and an output terminal which outputs the interrupt signal in synchronization with operations of the clock terminal and is made up of an OR circuit to which the interrupt signal fed from the output terminal of the D flip-flop and the interrupt permission signal fed from the register are input and wherein an output from the OR circuit is input to the first synchronization section.

Also, a preferable mode is one wherein the delay circuit is made up of an AND circuit to which an output signal fed from the register and a reversed signal of the interrupt setting pulse are input and wherein an output of the logical circuit is input to the both synchronization sections.

Also, a preferable mode is one wherein the delay circuit is made up of an OR circuit to which an output signal fed from the register and the interrupt clearing pulse are input and wherein an output from the OR circuit is input to the both synchronization sections.

Also, a preferable mode is one wherein the interrupt setting pulse generating section is made up of a D first flip-flop having a data input terminal to which the interrupt requesting signal fed from the one device is input, a clock input terminal to which the first clock is input and an output terminal from which the signal is output with a delay being equivalent to one clock period of the first clock in synchronization with the first clock and of a second D flip-flop having a data input terminal to which the signal is input from the output terminal, a clock input terminal to which the first clock is input and an output terminal from which a reversed signal of the signal with a delay being equivalent to one clock period of the first clock is output in synchronization with the clock terminal and of an OR circuit to which the both signals fed from the output terminals of the first and second D flip-flop are input and wherein the AND circuit outputs, in synchronization with the first clock, one pulse with a pulse width being equivalent to one clock period of the first clock, as the interrupt setting pulse signal to the register.

Also, a preferable mode is one wherein the second D flip-flop has a set input terminal receiving a control signal from the control circuit and outputs, while receiving the control signal, the reversed signal to the output terminal, which causes the interrupt setting pulse generating section, while receiving the control signal from the control circuit, to stop the outputting of the interrupt setting pulse signal.

Also, a preferable mode is one wherein the interrupt clearing pulse generating section is made up of a first D flip-flop having a data input terminal to which the interrupt clearing request signal fed from the other device is input, a clock input terminal to which the second clock is input and an output terminal which outputs the signal with a delay being equivalent to one clock period of the second clock in synchronization with the second clock and of a second D flip-flop having a data input terminal to which the signal fed from the output terminal is input, a clock input terminal to which the second clock is input and an output terminal which outputs a reversed signal of the signal with a delay being equivalent to one clock period of the clock in synchronization with operations of the clock terminal and of an AND circuit to which the both signals fed from the output terminals of the first and second D flip-flop are input, wherein the AND circuit outputs one pulse having a pulse width being equivalent to one clock period of the second clock as the interrupt clearing pulse signal, in synchronization with the second clock, to the register.

Also, a preferable mode is one wherein the second D flip-flop has a set input terminal receiving a control signal from the control circuit and outputs, while receiving the control signal, the reversed signal to the output terminal, which causes the interrupt clearing pulse generating section, while receiving the control signal from the control circuit, to stop the outputting of the interrupt clearing pulse signal.

Also, a preferable mode is one wherein the first synchronization section is provided with a first D flip-flop having a data input terminal to which the interrupt signal is input from the delay circuit, a clock input terminal to which the second clock is input and an output terminal which outputs the signal with a delay being equivalent to one clock period of the second clock in synchronization with the clock and with a second D flip-flop having a data input terminal to which the signal is input from the output terminal, a clock input terminal to which the clock is input and an output terminal which outputs the signal with a delay being equivalent to one clock period of the second clock in synchronization with the second clock, to the other device.

Also, a preferable mode is one wherein the second synchronization section is made up of a first D flip-flop having a data input terminal to which the interrupt permission signal is input from the delay circuit, a clock input terminal to which the first clock is input and an output terminal which outputs the signal with a delay being equivalent to one clock period of the first clock in synchronization with the first clock and of a second D flip-flop having a data input terminal to which the signal is input from the output terminal, a clock input terminal to which the first clock is input and an output terminal which outputs the signal with a delay being equivalent to one clock period of the first clock in synchronization with the first clock, to the one device.

BRIEF DESCRIPTION OF THE DRAWINGS

The above and other objects, advantages and features of the present invention will be more apparent from the following description taken in conjunction with the accompanying drawings in which.

DESCRIPTION OF THE PREFERRED EMBODIMENTS

Best modes of carrying out the present invention will be described in further detail using various embodiments with reference to the accompanying drawings.

First Embodiment

Figure 1:
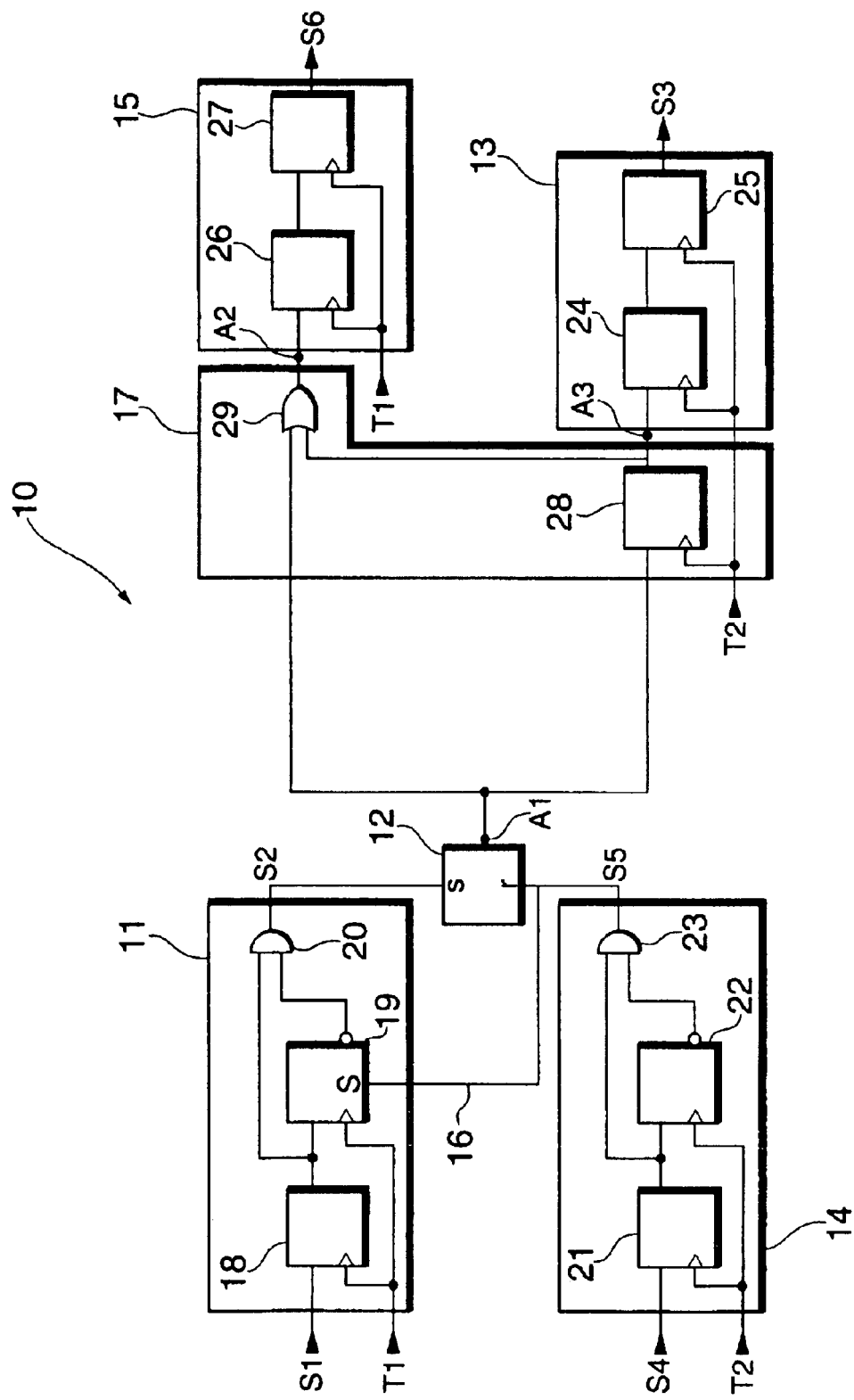
FIG. 1 is a schematic block diagram showing configurations of an interrupt signal processing apparatus according to a first embodiment of the present invention.

An interrupt signal processing apparatus 10 of a first embodiment shown in FIG. 1 is a signal processing apparatus connected between two processing devices (not shown) each operating on an operation clock having a different clock speed, which is adapted to process a request for interruptions from one processing device to the other processing device.

The interrupt signal processing apparatus 10 of the embodiment shown in FIG. 1 is made up of an interrupt setting pulse generating section 11 used to produce, when receiving an interrupt requesting signal S1 from one processing device, an interrupt setting pulse signal S2 using timing provided by an operation clock T1 for the one processing device, a register 12 used to store the interrupt setting pulse signal S2 as an interrupt signal S3 to be provided to the other processing device, a first synchronization section 13 used to output the interrupt signal S3, in synchronization with an operation clock T2 for the other processing device to the other processing device, an interrupt clearing pulse generating section 14 used to produce, when receiving an interrupt clearing request signal S4 from the other processing device, an interrupt clearing pulse signal S5 using the timing provided by the operation clock T2 for the other processing device in order to clear the register 12 and a second synchronization section 15 used to output, when receiving the interrupt clearing pulse signal S5, a signal fed from the register 12 as an interrupt permission signal S6 to the other processing device, in synchronization with the operation clock T1 for the one processing device.

Moreover, the interrupt signal processing apparatus 10 of the embodiment also includes a control circuit 16 disposed between the interrupt setting pulse generating section 11 and the interrupt clearing pulse generating section 14 and adapted to control the generation of the interrupt setting pulse signal S2 using the interrupt clearing pulse S5 and a delay circuit 17 used to provide a time delay using timing provided by the interrupt clearing pulse signal S5 to the interrupt permission signal S6 output from the second synchronization section 15.

The interrupt setting pulse generating section 11 is provided with a first D flip-flop 18, a second D flip-flop 19 connected in series to the first D flip-flop 18 and an AND circuit 20 used to receive an output signal from the both first and second D flip-flops 18 and 19.

The first D flip-flop 18 is adapted to receive the interrupt requesting signal S1 having a pulse width coinciding with a clock period of the operation clock T1 for use in the one processing device through one of its input terminals, and to output, when receiving the operation clock T1 for use in the one processing device through the other of its input terminals, in synchronization with the clock T1, a signal which is delayed by one clock period to the second D flip-flop 19 and the AND circuit 20 through its output terminal.

The second D flip-flop 19 is adapted to receive the signal output from the first D flip-flop 18 through one of its input terminals and to output, when receiving the clock T1 through the other of its input terminals, a reversed signal obtained by reversing a signal which is delayed by one clock period, in synchronization with the clock T1, to the AND circuit 20 through its reverse output terminal.

The second D flip-flop 19 has a set inputting terminal S used to receive a control signal from the control circuit 16 and outputs, while it is receiving the control signal, a signal represented by using negative logic is output from the reverse output terminal.

The AND circuit 20 is adapted to receive the interrupt requesting signal S1 from the first D flip-flop 18 through one of its input terminals and the reversed signal from the second D flip-flop 19 through the other of its input terminals and generates a pulse signal corresponding to the AND of the both input signals. By ANDing the both input signals, from the interrupt requesting signal S1 having a pulse width being equivalent to two clock periods of the clock T1 input to the one input terminal is generated the interrupt setting pulse S2 having a half of the pulse width of the interrupt requesting signal S1.

Therefore, the interrupt setting pulse generating section 11, when receiving the interrupt requesting signal S1 having a pulse width being equivalent to two clock periods of the clock T1 from the one processing device, unless its second D flip-flop 19 receives the control signal from the control circuit 16 through the set inputting terminal S, outputs the interrupt setting pulse signal S2 having a pulse width being equivalent to one clock period of the clock T1 to the register 12 in synchronization with the clock T1.

Also, the interrupt setting pulse generating section 11, when the set inputting terminal S of its second D flip-flop 19 receives the control signal, stops outputting of the interrupt setting pulse signal S2.

The interrupt clearing pulse generating section 14 is provided with a first D flip-flop 21, a second D flip-flop 22 connected, in series, to the D flip-flip and an AND circuit 23 adapted to receive an output signal from the both D flip-flops 21 and 22.

The first D flip-flop 21 receives the interrupt clearing request signal S4 having a pulse width being equivalent to one clock period of the operation clock fed from the other processing device through one of its input terminals and, when it receives an operation clock T2 fed from the other processing device through the other of its input terminal, outputs a signal, in synchronization with the clock signal T2, which is delayed by one clock period of the clock T2, to the second D flip-flop 22 and the AND circuit 23 through its output terminal.

The second D flip-flop 22, when receiving a signal output from the first D flip-flop 21 through one of its input terminals and the clock T2 through the other of its input terminals, outputs, in synchronization with the clock T2, a reversed signal obtained by reversing a signal which is delayed by one clock period of the clock T2 to the AND circuit 23 through its reverse output terminal.

The AND circuit 23 receives the interrupt clearing request signal S4 from the first D flip-flop 21 through one input terminals and the reversed signal through the other input terminal and then outputs a pulse signal obtained by ANDing the both input signals. By ANDing the both input signals, from the interrupt requesting signal S4 having a pulse width being equivalent to two clock periods of the clock T2 input to the one of the input terminals is generated the interrupt setting pulse S5 having a half of the pulse width of the interrupt requesting signal S4.

Therefore, the interrupt clearing pulse generating section 14, when receiving the interrupt clearing request signal S4 having a pulse width being equivalent to two clock periods of the clock T2, outputs, in synchronization with the clock T2, the interrupt clearing pulse signal S5 having a pulse width being equivalent to one clock period of the clock T2, to the register 12 and the control circuit 16.

The register 12 is made up of an RS flip-flop having a set terminal "s" through which the interrupt setting pulse signal S2 is input, a reset terminal "r" through which the interrupt clearing pulse signal S5 is input and an output terminal in which an output signal is switched between two values by selective inputting of a signal to the both set terminal "s" and the reset terminal "r".

When the set terminal "s" receives the interrupt setting pulse signal S2, the RS flip-flop outputs the interrupt signal S3 represented by positive logic to the delay circuit 17. Moreover, when the reset terminal "r" receives the interrupt clearing pulse signal S5, the RS flip-flop, by reversing the output, outputs an interrupt permission signal S6 represented by using negative logic to the delay circuit 17.

In the RS flip-flop, since simultaneous inputting of the signals to the set terminal "s" or the reset terminal "r" is prohibited, the output is switched by selective inputting of the signal to the set terminal "s" or the reset terminal "r".

Since the simultaneous inputting of the signals, that is, duplicated signal inputting causes unstable outputting from the register 12, in order to prevent the unstable operation of the register 12 and duplicated inputting of the both signals, the control circuit 16 is used.

In the example of the embodiment, the interrupt setting pulse generating section 11 is controlled by the interrupt clearing pulse generating section 14 through an operation of the control circuit 16. The control circuit 16 is made up of a control line used to cause the interrupt clearing pulse signal S5 being an output signal from the interrupt clearing pulse generating section 14 to be input to the set input terminal S of the interrupt setting pulse generating section 11.

Figure 3:
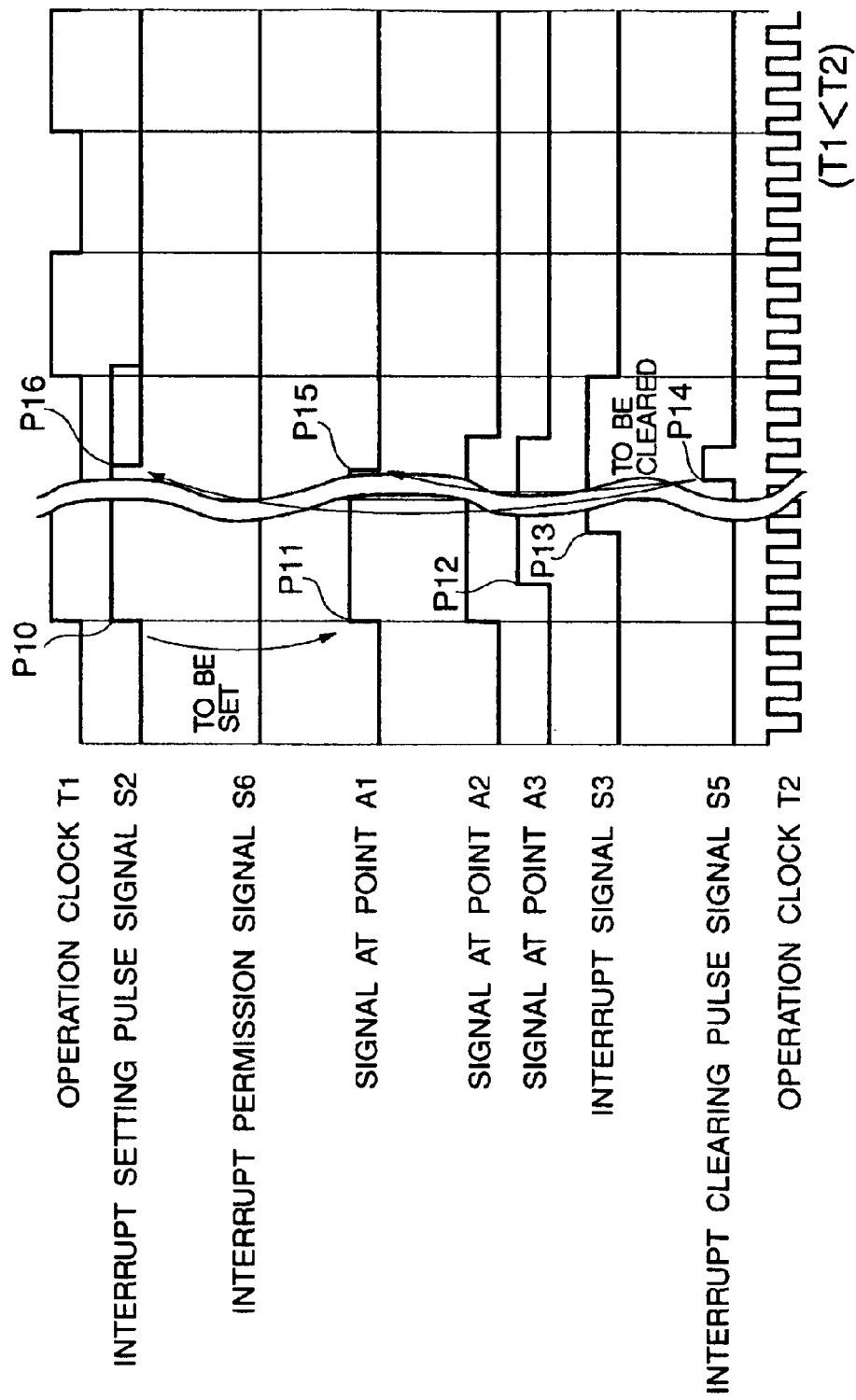
FIG. 3 is a time chart showing operations of the interrupt signal processing apparatus in which the speed of the operation clock for the one processing device requiring the interruption is lower than that for the operation clock of the other processing device to be interrupted, according to the first embodiment of the present invention.

As shown in the time chart in FIG. 3, for example, if a speed of the operation clock T1 for the one processing device is lower than that of the operation clock T2 for the other processing device, the interrupt setting pulse generating section 11 being operated on the operation clock T1 having the lower speed is controlled by the interrupt clearing pulse generating section 14 being operated on the operation clock T2.

That is, while the register 12 is receiving the interrupt setting pulse signal S2 from the interrupt setting pulse generating section 11 through its set terminal "s", if the interrupt clearing pulse S5 is output from the interrupt clearing pulse generating section 14, the interrupt clearing pulse S5 is input to the set input terminal S of the second D flip-flop 19 in the interrupt setting pulse generating section 11. The inputting of the interrupt clearing pulse signal S5 to the set input terminal S of the second D flip-flop 19, even if the interrupt setting pulse generating section 11 is outputting the interrupt setting pulse signal S2, causes the interrupt setting pulse generating section 11 to stop the outputting of the interrupt setting pulse signal S2. Therefore, when the interrupt clearing pulse S5 is output from the interrupt clearing pulse generating section 14, since the outputting of the interrupt setting pulse signal S2 to the register 12 is stopped, the duplicate inputting of the signal to the set terminal "s" and the reset terminal "r" can be prevented.

The first synchronization section 13, as is well known, is made up of the first D flip-flop 24 and the second D flip-flop 25 connected in series to the D flip-flop.

When one of the terminals of the first D flip-flop 24 receives an interrupt signal S3 represented by using positive logic fed through the delay circuit 17 from the register 12 and the other of its terminals receives the operation clock T2 transmitted from the other of the devices, a signal which is delayed by one clock period is output, from an output of the first D flip-flop 24 to the second D flip-flop 25, in synchronization with the clock T2.

When one of the terminals of the second D flip-flop 25 receives an signal output from the first D flip-flop 24 and the other of its terminals receives the operation clock T2, a signal which is delayed by one clock period is output in synchronization with the clock T2.

Therefore, the first synchronization section 13, when receiving the interrupt signal S3 from the delayed circuit 17, outputs the interrupt signal S3 with the delay being equivalent to two clock periods of the clock T2. After a fluctuation occurring at a time of a rise of the interrupt signal S3 has been removed by giving such the time delay to the signal S3, the interrupt signal S3 is output to the other devices in synchronization with the clock T2.

The second synchronization section 15, as is well known, is provided with a first D flip-flop 26 and a second D flip-flop 27 connected in series to the first D flip-flop 26.

The first D flip-flop 26, when receiving, through one of its input terminals, the interrupt permission signal S6 represented by using negative logic having passed through the delay circuit 17 and, at the same time, the operation clock T1 fed from the other processing device through the other of the input terminals, outputs a signal which is delayed by one clock period of the operation clock T1, in synchronization with the clock T1 to the second D flip-flop 27.

The second D flip-flop 27, when receiving, through one of its input terminals, a signal output from the first D flip-flop 26 and, through the other of the input terminals, the operation clock T1, outputs a signal which is delayed by one clock period of the operation clock T1 in synchronization with the clock T1.

Therefore, the second synchronization section 15, when receiving the interrupt permission signal S6 from the delay circuit 17, outputs the interrupt permission signal S6 which is delayed by two clock periods of the clock T1. After a fluctuation occurring at a time of a fall of the interrupt permission signal S6 has been removed by giving such the time delay to the signal S6, the interrupt signal S6 is output to the other of the devices in synchronization with the clock T1.

The delay circuit 17 is disposed among the register 12, both the synchronization sections 13 and 15 and is provided with a D flip-flop 28, an OR circuit 29 adapted to receive an output from the D flip-flop 28 and an output from the register 12.

The D flip-flop 28, receives an output from the register 12 through one of the input terminals. The output from the register 12 represents the interrupt signal S3 when positive logic is used and represents the interrupt signal S6 when negative logic is used. The D flip-flop 28, when receiving, through one of its input terminals, the operation clock T2 for the other processing device, outputs, through its output terminals, a signal derived from the input signal from the register 12 which is delayed by one clock period of the operation clock T2, in synchronization with the operation clock T2, to the OR circuit 29 and the first synchronization section 13. The OR circuit 29, when receiving a signal which is delayed by one clock period of the operation clock T2, from the D flip-flop 28 in synchronization with the clock T2 through one of its input terminals and, through the other of its input terminals, the interrupt permission signal S6 output from the register 12, outputs the interrupt permission signal S6 represented by using negative logic corresponding to the OR of the both input signals. This causes the interrupt permission signal S6 to be delayed while the interrupt clearing pulse S5 generated in synchronization with the operation clock T2 is input to the reset terminal "r" of the register 12 and to be output after the occurrence of the delay.

Therefore, the interrupt signal S3 represented by using positive logic output from the register 12 is input to the first synchronization section 13 with a delay being equivalent to one clock period of the operation clock T2 which is produced by the passage of the interrupt signal S3 through the delay circuit 17 and then, as described above, is output with a delay being equivalent to two clock delays of the operation clock T2 to the other processing device. Moreover, the interrupt signal S3 represented by using negative logic output from the register 12 is input, with a delay produced by the passage of the interrupt signal S3 through the delay circuit 17 being equivalent to the time required for the interrupt clearing pulse signal S5 to input the reset terminal "r" of the register 12 that is, after the interrupt clearing pulse S5 is turned off, to the first synchronization section 13, and then is output to the other processing device with a delay being equivalent to two clock periods of the operation clock T1.

Figure 2:
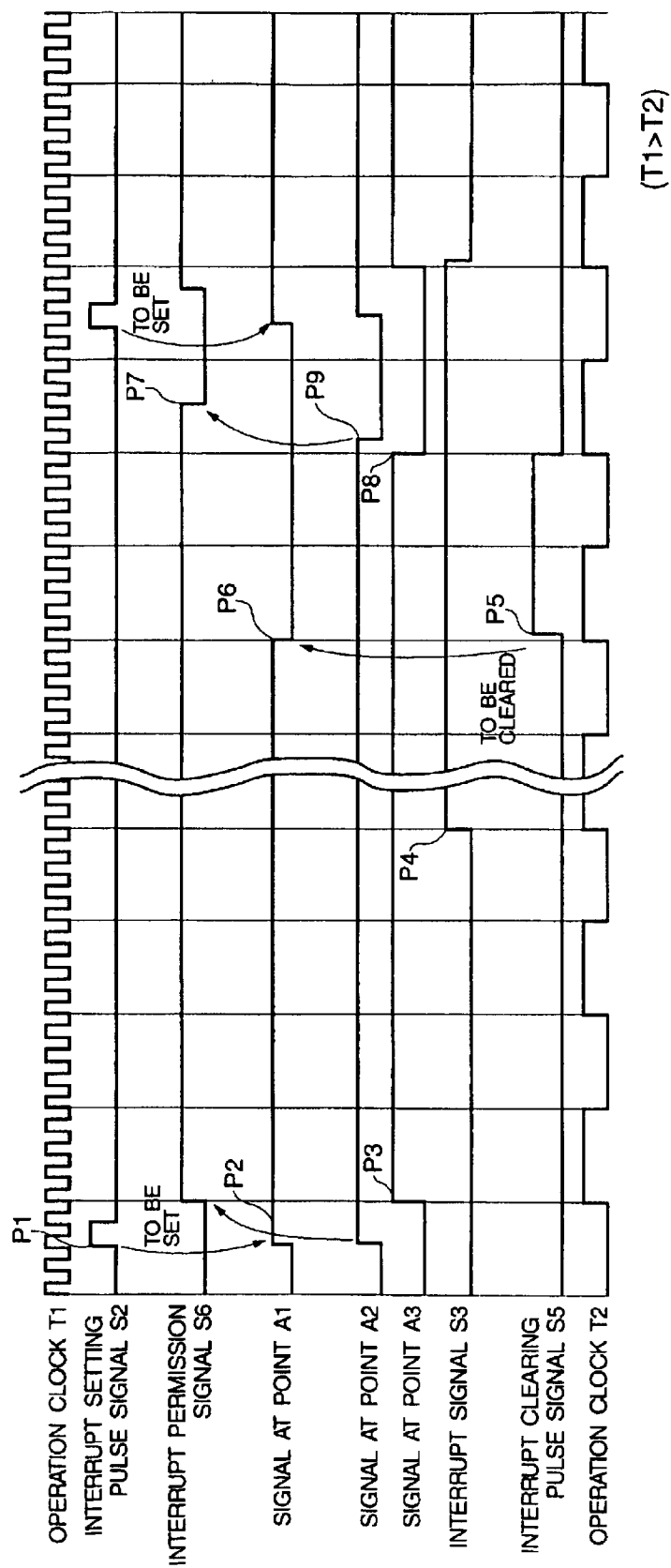
FIG. 2 is a time chart showing operations of the interrupt signal processing apparatus in which a speed of an operation clock for one processing device requiring an interruption is higher than that for an operation clock of the other processing device to be interrupted, according to the first embodiment of the present invention.

Operations of the interrupt signal processing apparatus 10 of the present invention will be described by referring to the time chart shown in FIG. 2. FIG. 2 is the time chart showing operations of the interrupt signal processing apparatus in which a speed of the operation clock T1 for the one processing device requiring the interruption is higher than that of the operation clock T2 for the other processing device to be interrupted, according to the first embodiment of the present invention.

When the one processing device operating on the high-speed clock is going to generate an interruption to the other processing device operating on the low-speed clock, as is well known, the one processing device, after having confirmed that the interruption is allowed, outputs the interrupt requesting signal S1 having a pulse width being equivalent to two clock periods of the operation clock T1 to the interrupt signal processing apparatus 10. In the interrupt signal processing apparatus 10, the interrupt setting pulse generating section 11, when receiving the interrupt requesting signal S1, in response to this signal S1, generates the interrupt setting pulse signal S2 which rises at a time point P1 in synchronization with the operation clock T1, as shown in FIG. 1.

When the interrupt setting pulse signal S2 being generated in synchronization with the operation clock T1 and having a width being equivalent to one clock period of the operation clock T1 is input to the set terminal "s" of the register 12, the output of the register 12 rises at a time point P2 shown in FIG. 2. This causes the interrupt signal S3 represented by using positive logic to be substantially stored in the register 12.

The interrupt signal S3, as shown at time point P3 in FIG. 2, is input with a delay being equivalent to one clock period of the operation clock T2, which is produced by the passage of the interrupt signal S3 through the delay circuit 17, in synchronization with the operation clock T2 for the other processing device, to the first synchronization section 13. In the first synchronization section 13, the interrupt signal S3 with the delay produced by the passage through the delay circuit 17 is further given a delay being equivalent to two clock periods of the clock T2 as shown at a time point P4 in FIG. 2. This allows the interrupt signal S3 being stable to be output to the other device.

The other processing device, when receiving the interrupt signal S3 fed from the interrupt signal processing apparatus 10, performs processing so as to respond to the request for the interruption. When this processing has been completed, the other processing device, in order to notify the one processing device that a new interruption is allowed, outputs the interrupt clearing request signal S4 having a pulse width being equivalent to two clock periods of the operation clock T2, to the interrupt signal processing apparatus 10.

The interrupt clearing pulse generating section 14 in the interrupt signal processing apparatus 10, when receiving the interrupt clearing request signal S4, as shown in FIG. 2, generates, in response to the interrupt clearing request signal S4, the interrupt clearing pulse S5 which rises at a time point P5 in synchronization with the clock T2.

When the interrupt clearing pulse signal S5 having a pulse width being equivalent to one clock period of the operation clock T2 is input to the reset terminal "r" of the register 12, as shown by a time point P6 in FIG. 2, an output from the register 12 is reversed. This reversed signal, after passing through the delay circuit 17, is output, as the interrupt permission signal S6, to the second synchronization section 15. The second synchronization section 15 outputs the interrupt permission signal S6 represented by using negative logic, with a delay being equivalent to two clock periods of the operation clock T1, as shown by a time point P7 in FIG. 2, to the one processing device.

The one processing device judges, by its polling operation, whether it has received the interrupt permission signal S6 and, if it has received the interrupt permission signal S6, can confirm that the interruption is allowed in the other processing device.

The delay circuit of the present invention is adapted to provide, using the D flip-flop 28 of the delay circuit 17, a time delay being equivalent to one clock period of the operation clock T2 to the interrupt permission signal S6, as shown by a time point P8 in FIG. 2. Moreover, the delay circuit 17 as shown by a time point P9 in FIG. 2, by using the OR circuit 29, one terminal of which receives the interrupt permission signal S6 which has been delayed by one clock period of the operation clock T2 and the other terminal of which receives the interrupt permission signal S6 fed from the register 12, as described above, provides a time delay being equivalent to the time required for the interrupt clearing pulse signal S5 to be input to the reset terminal "r" of the register 12, to the interrupt permission signal S6 and outputs it to the second synchronization circuit 15.

As described above, the interrupt signal processing apparatus 10, gives, by using the delay action of the delay circuit 17, the time delay being equivalent to the time required for the interrupt clearing pulse S5 entering the register 12 to fall, to operations of transmitting the interrupt permission signal S6 from the second synchronization circuit 15 to the one processing device.

Therefore, even if a new interrupt requesting signal S1, immediately after the interrupt permission signal S6 has been transmitted with the above time delay, is output from the one processing device using the operation clock T1 having the clock speed being higher than that of the operation clock T2 used in the other processing device to the interrupt signal processing apparatus 10, no simultaneous inputting occurs of a new interrupt setting pulse signal S2 to be produced by the interrupt setting pulse generating section 11 based on the new interrupt requesting signal S1 and the interrupt clearing pulse signal S5 produced on the low-speed operation clock T2 to the register 12.

In the conventional interrupt signal processing apparatus having no delay circuit, when the interrupt requesting signal S1 is output from the processing device using the high-speed operation clock to the processing device using the low-speed operation clock, since a new interrupt setting pulse signal S1 is generated in response to the new interrupt requesting signal S1 and the interrupt clearing request signal S4 fed from the processing device using the low-speed operation clock is produced on the low-speed operation clock T2, duplicate inputting of the interrupt setting pulse signal S2 and the interrupt clearing pulse signal S5 to the register 12 occurs in some cases, thus causing an unstable operation of the interrupt signal processing apparatus.

Unlike the conventional interrupt signal processing apparatus, according to the interrupt signal processing apparatus 10 of the present invention, as described above, since the delay circuit 17 gives the time delay being equivalent to the time required for the interrupt clearing pulse signal S5 to fall, to the operation of transmitting the interrupt permission signal 6, it is possible to prevent the duplicated inputting of the interrupt setting pulse S2 fed from the processing device operating on the high-speed operation clock in response to the interrupt requesting signal S1 and the interrupt clearing pulse signal S5 based on the interrupt clearing request signal S4 fed from the processing device operating on the low-speed operation clock to the register 12, thus enabling smooth interruption without causing unstable operations attributable to the duplicated inputting of the both signals.

FIG. 3 is a time chart showing operations of the interrupt signal processing apparatus in which a speed of an operation clock T1 for the one processing device requiring an interruption is lower than that of an operation clock T2 for the other processing device to be interrupted, according to the first embodiment of the present invention.

When the one processing device operating on a low clock speed causes the other processing device operating on a high clock speed to perform interrupt processing, as is conventionally known, the one processing device, after having confirmed that the interruption is allowed, outputs the interrupt requesting signal S1 having a clock pulse width being equivalent to two clock periods of the operation clock T1 to the interrupt signal processing apparatus 10. The interrupt setting pulse generating section 11 in the interrupt signal processing apparatus 10, when receiving the interrupt requesting signal S1, outputs, in response to the interrupt requesting signal S1 and in synchronization with the operation clock T1, the interrupt setting pulse signal S2 which rises as shown by a time point P10 in FIG. 3.

When the interrupt setting pulse signal S2 having a pulse width being equivalent to one clock period of the operation clock T1 is input to the set terminal "s" of the register, an output from the register 12 rises as shown by a time point P11 in FIG. 3. This causes the interrupt signal S3 represented by using positive logic to be substantially stored in the register 12.

The interrupt signal S3 as shown by a time point P12 in FIG. 3, with a delay caused by the delay circuit 17 being equivalent to one clock period of the operation clock T2 and in synchronization with the operation clock T2 of the other processing device, is input to the first synchronization section 13. The first synchronization section 13, when receiving the interrupt signal S3 delayed by the delay circuit 17, further delays the interrupt signal S3 by two clock periods of the operation clock T2 as shown by a time point P13 in FIG. 3

The other processing device, when receiving the interrupt signal S3 from the interrupt signal processing apparatus 10, performs processing to respond to the interrupt request from the one processing device. After this processing has been completed, the other processing device, in order to notify the one processing device that a new interruption is allowed, outputs the interrupt clearing request signal S4 having a pulse width being equivalent to two clock periods of the operation clock T2 to the interrupt signal processing apparatus 10.

The interrupt clearing pulse generating section 14 in the interrupt signal processing apparatus 10, when receiving the interrupt clearing request signal S4, generates, as shown in FIG. 3, the interrupt clearing pulse signal S5 which rises at a time point P14, in synchronization with the clock T2.

The interrupt clearing pulse signal S5 having a pulse width being equivalent to one clock period of the operation clock T2 operating in synchronization with the operation clock T2 is input to the reset terminal "r" of the register 12, as shown by a point P15 in FIG. 3, an output of the register 12 is reversed. The reversed signal is output, as the interrupt permission signal S6, through the delay circuit 17, to the second synchronization section 15. The second synchronization section 15 outputs the interrupt permission signal S6 represented by using negative logic with a delay being equivalent two clock periods of the operation clock T1 to the one processing device.

The one processing device judges, by its polling operation, whether it receives the interrupt permission signal S6 and, if it receives the interrupt permission signal S6, can confirm that the interruption is allowed in the other processing device.

In the interrupt signal processing apparatus 10, when the interrupt clearing request signal S4 is received, the interrupt clearing pulse signal S5 produced in synchronization with the high-speed operation clock T2 is input to the reset terminal "r" of the register 12, thereby resetting the register 12.

In the example of the time chart shown in FIG. 3, since the interrupt setting pulse signal S2 is operated in synchronization with the operation clock T1 having a clock speed being lower than that of the operation clock T2 in synchronization with which the interrupt clearing pulse signal S5 is operated, when the interrupt clearing pulse signal S5 resets the register 12, as described above, there is a fear that the interrupt setting pulse signal S2 continues to be input to the set terminal "s" of the register 12, which may cause duplicated inputting to the register 12.

However, as described above, the interrupt setting pulse generating section 11 operating on the low-speed operation clock T1 stops the generation of the interrupt setting pulse S2, as shown by a time point P16 in FIG. 3, due to the receipt of the interrupt clearing pulse S5 fed from the interrupt clearing pulse generating section 14 operating on the high-speed operation clock T2.

Thus, the duplicated inputting of the interrupt clearing pulse signal S5 based on the interrupt clearing request signal S4 fed from the processing device operating on the high-speed operation clock and of the interrupt setting pulse signal S2 based on the interrupt request signal S1 fed from the processing device operating on the low-speed operation clock, to the register 12, can be prevented, thus enabling smooth interruption without causing unstable operations attributable to the duplicated inputting of the both signals.

Therefore, according to the interrupt signal processing apparatus 10 of the present invention, as shown in time charts in FIG. 2 and FIG. 3, regardless of a relation in operation clock speeds between the two processing devices, since the duplicated inputting of the interrupt setting pulse S2 and interrupt clearing pulse S5 to the register 12 can be prevented, an interruption is implemented without considerations given to a difference in the clock speed between two processing devices.

Thus, according to the interrupt signal processing apparatus 10 of the present invention, the interruption can be implemented without taking the relation in the speeds of operation clocks into consideration and without the need for a switching mechanism to switch between the interrupt priority function and the interrupt clearing priority function and without the need for switching operations.

Second Embodiment

Figure 4:
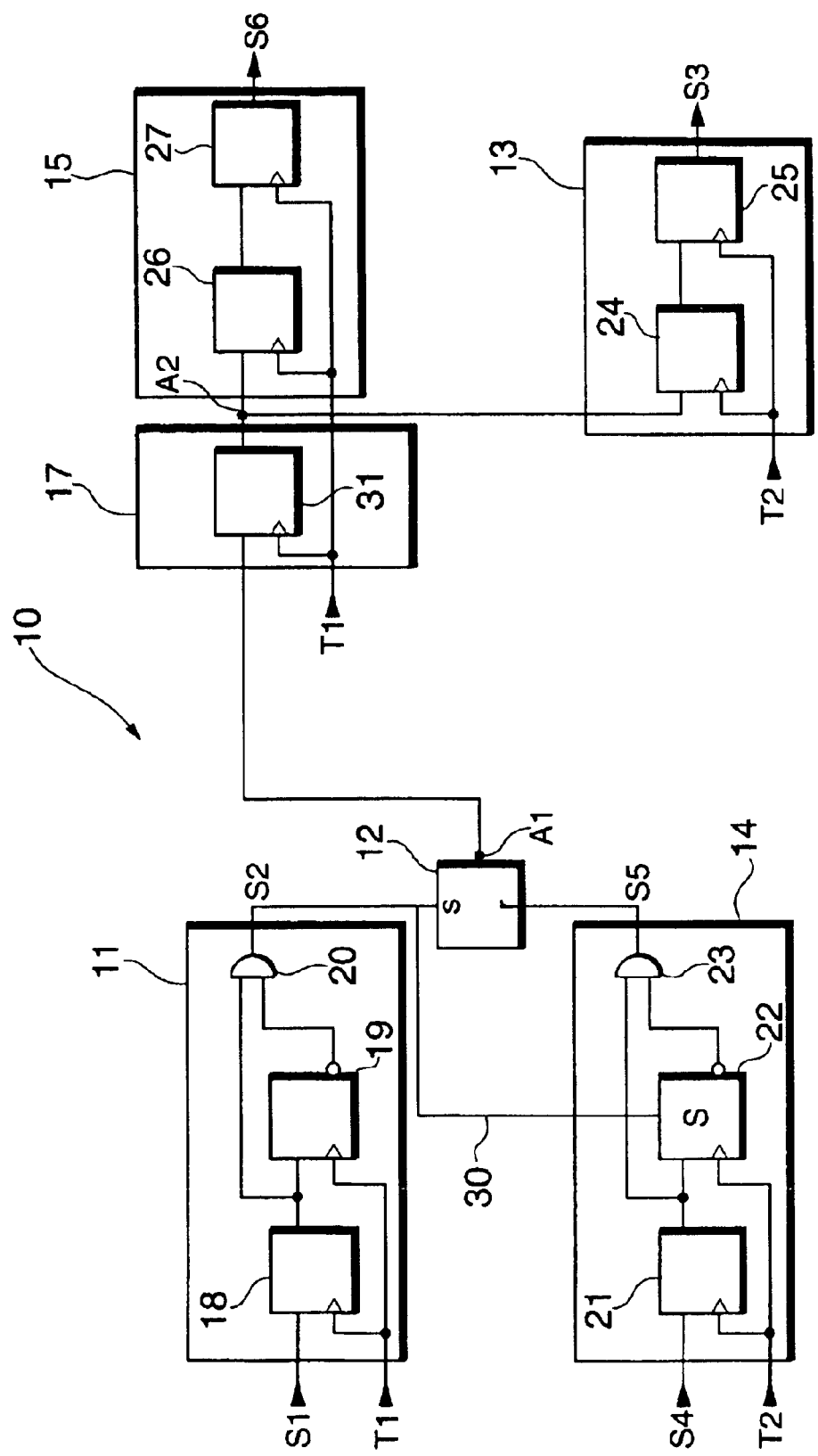
FIG. 4 is a schematic block diagram showing configurations of an interrupt signal processing apparatus according to a second embodiment of the present invention.

Configurations of the interrupt signal processing apparatus 10 of a second embodiment shown in FIG. 4 are basically the same as those in the first embodiment. The interrupt signal processing apparatus 10 of the second embodiment includes an interrupt setting pulse generating section 11 used to output, when receiving an interrupt requesting signal S1 from one processing device, an interrupt setting pulse signal S2 using timing provided by the operation clock T1, on which the one processing device is operated, a register 12 used to store the interrupt setting pulse S2 as an interrupt signal S3 to the other processing device, a first synchronization section 13 used to output the interrupt signal S3 fed from the register 12, in synchronization with the operation clock T2 used by the other processing device, to the other processing device, an interrupt clearing pulse generating section 14 used to generate, when receiving the interrupt clearing request signal S4 fed from the other processing device, an interrupt clearing pulse signal S5 operating on the clock T2 as a reference pulse, on which the other operating device is operated, in order to clear the register 12 and a second synchronization section 15 used to output, when receiving the interrupt clearing pulse signal S5, an interrupt permission signal S6 fed from the register 12, in synchronization with the operation clock T1 used by the one processing device, to the one processing device.

Moreover, the interrupt signal processing apparatus 10 of the second embodiment includes a delay circuit 17 and a control circuit 30. In the interrupt signal processing apparatus 10 of the second embodiment, unlike in the case of the first embodiment, the control circuit 30 is disposed between the interrupt setting pulse generating circuit 11 and the interrupt clearing pulse generating circuit 14 so that the interrupt setting pulse signal S2 can control the interrupt clearing pulse signal S5. The delay circuit 17 is disposed among the register 12, first synchronization section 13 and second synchronization section 15 and provides a time delay corresponding to the interrupt setting pulse signal S2 to the interrupt signal S3 fed from the first synchronization section 13. In the example shown in FIG. 4, the interrupt clearing pulse generating section 14 is controlled by the interrupt setting pulse generating section 11 through the control circuit 30. The control circuit 30 is made up of control lines adapted to input the interrupt setting pulse S2 being an output signal fed from the interrupt setting pulse generating section 11 to the set input terminal "s" in the interrupt clearing pulse generating section 14.

When the interrupt setting pulse signal S2 fed from the interrupt setting pulse section 14 is input to the set input terminal S of a second D flip-flop 22 in the interrupt clearing pulse generating section 14, the control circuit 30, while the interrupt setting pulse signal S2 is output to the register 12, controls so that outputting of the interrupt clearing pulse signal S4 to the register 12 is stopped.

The delay circuit 17 is disposed among the register 12, synchronization sections 13 and 15 and has a D flip-flop 31. The D flip-flop 31, when receiving the interrupt signal S3 or the interrupt permission signal S6 output from the register 12 through its one input terminal and receiving the operation clock T1 fed from the one processing terminal through the other input terminal, outputs the interrupt signal S3 with a delay being equivalent to one clock period of the operation clock T1 from its output terminal in synchronization with the operation clock T1 and the interrupt permission signal S6 with a delay being equivalent to one clock period of the operation clock T1 from its output terminal in synchronization with the operation clock T1.

Figure 5:
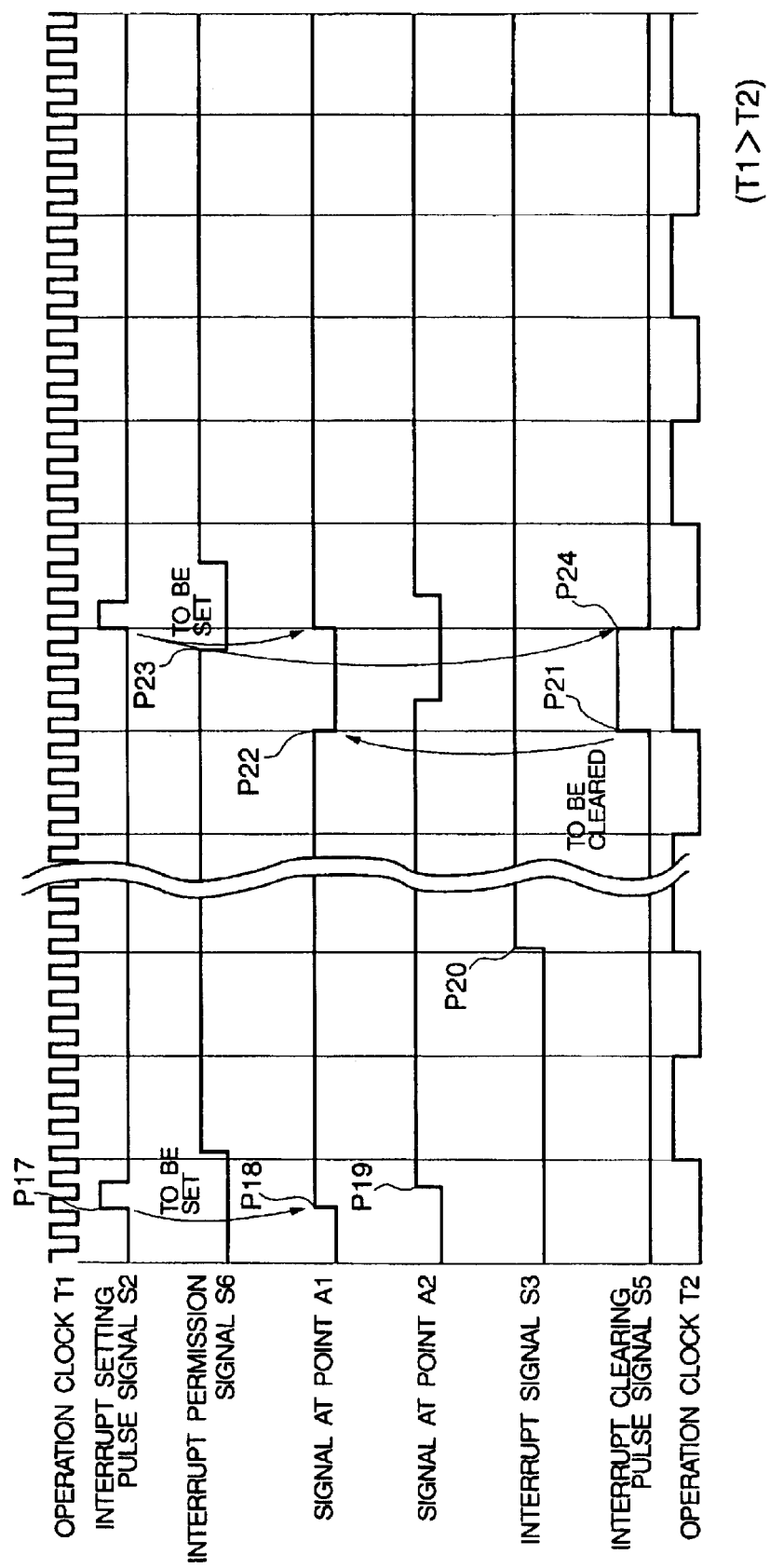
FIG. 5 is a time chart showing operations of the interrupt signal processing apparatus in which a speed of an operation clock for one processing device requiring an interruption is higher than that for an operation clock of the other processing device to be interrupted, according to the second embodiment of the present invention.

FIG. 5 is a time chart showing operations of the interrupt signal processing apparatus 10 of the second embodiment in which a speed of the operation clock T1 for the one processing device requiring the interruption is higher than that for the operation clock T2 of the other processing device to be interrupted. When the one processing device operating on a high speed clock is going to generate an interruption to the other processing device operating on a low speed clock, as is well known, the one processing device, after having confirmed that the interruption is allowed, outputs the interrupt requesting signal S1 having a pulse width being equivalent to that of two clock periods of the operation clock T1, to the interrupt signal processing apparatus 10. In the interrupt signal processing apparatus 10, the interrupt setting pulse generating section 11, when receiving the interrupt requesting signal S1, in response to this signal S1, generates the interrupt setting pulse signal S2 which rises at a time point P17 in synchronization with the operation clock T1, as shown in FIG. 5.

When the interrupt setting pulse signal S2 being generated in synchronization with the operation clock T1 and having a width being equivalent to one clock period of the operation clock T1 is input to the set terminal "s" of the register 12, the output of the register 12 rises at a time point P18 shown in FIG. 5. This causes the interrupt signal S3 represented by using positive logic to be substantially stored in the register 12.

The interrupt signal S3, as shown at time point P19 in FIG. 5, is input with a delay being equivalent to one clock period of the operation clock T2, which is produced by the passage of the interrupt signal S3 through the delay circuit 17, in synchronization with the operation clock T2 for the other processing device, to the first synchronization section 13. In the first synchronization section 13, the interrupt signal S3 with the delay produced by the passage through the delay circuit 17 is further given a time delay being equivalent to two clock periods of the clock T2 as shown at a time point P20 in FIG. 5.

The other processing device, when receiving the interrupt signal S3 fed from the interrupt signal processing apparatus 10, performs processing so as to respond to the request for the interruption.

When this processing has been completed, the other processing device, in order to notify the one processing device that a new interruption is allowed, outputs the interrupt clearing request signal S4 having a pulse width being equivalent to two clock periods of the operation clock T2, to the interrupt signal processing apparatus 10.

The interrupt clearing pulse generating section 14 in the interrupt signal processing apparatus 10, when receiving the interrupt clearing request signal S4, as shown in FIG. 5, generates, in response to the interrupt clearing request signal S4, the interrupt clearing pulse S5 which rises at a time point P21 in synchronization with the clock T2.

When the interrupt clearing pulse signal S5 having a pulse width being equivalent to one clock period of the operation clock T2 is input to the reset terminal "r" of the register 12, as shown by a time point P22 in FIG. 5, an output from the register 12 is reversed. This reversed signal, after passing through the delay circuit 17, is output, as the interrupt permission signal S6, to the second synchronization section 15. The second synchronization section 15 outputs the interrupt permission signal S6 represented by using negative logic, with a delay being equivalent to two clock periods of the operation clock T1, as shown by a time point P23 in FIG. 5, to the one processing device.

The one processing device judges, by its polling operation, whether it has received the interrupt permission signal S6 and, if it has received the interrupt permission signal S6, can confirm that the interruption is allowed in the other processing device.

In the interrupt signal processing apparatus 10 of the second embodiment of the present invention, when the interrupt requesting signal S1 is input, the interrupt setting pulse signal S2 which is generated in synchronization with the high-speed clock T1 is input to the set terminal "s" of the register 12, which sets the register 12. In the example of the time chart shown in FIG. 5, since the interrupt clearing pulse signal S5 is operated in synchronization with the operation clock T1 having a clock speed being lower than that of the operation clock T2, when the interrupt setting pulse signal S2 sets the register 12, there is a fear that the interrupt clearing pulse signal S5 continues to be input to the reset terminal "r" of the register 12, which may cause duplicated inputting to the register 12.

However, as described above, in the interrupt clearing pulse generating section 14 operating on the low-speed clock pulse T2, the generation of the interrupt clearing pulse signal S5 is stopped by the interrupt setting pulse signal S2 fed from the interrupt setting pulse generating section 11 operating on the high-speed clock pulse T1 as shown at a time point P24 in FIG. 5.

Thus, the duplicated inputting of the interrupt setting pulse signal S2 based on the interrupt setting request signal S1 fed from the processing device operating on the high-speed operation clock and of the interrupt clearing pulse signal S5 based on the interrupt clearing request signal S4 fed from the processing device operating on the low-speed operation clock, to the register 12, can be prevented, thus enabling smooth interruption without causing unstable operations attributable to the duplicated inputting of the both signals.

Figure 6:
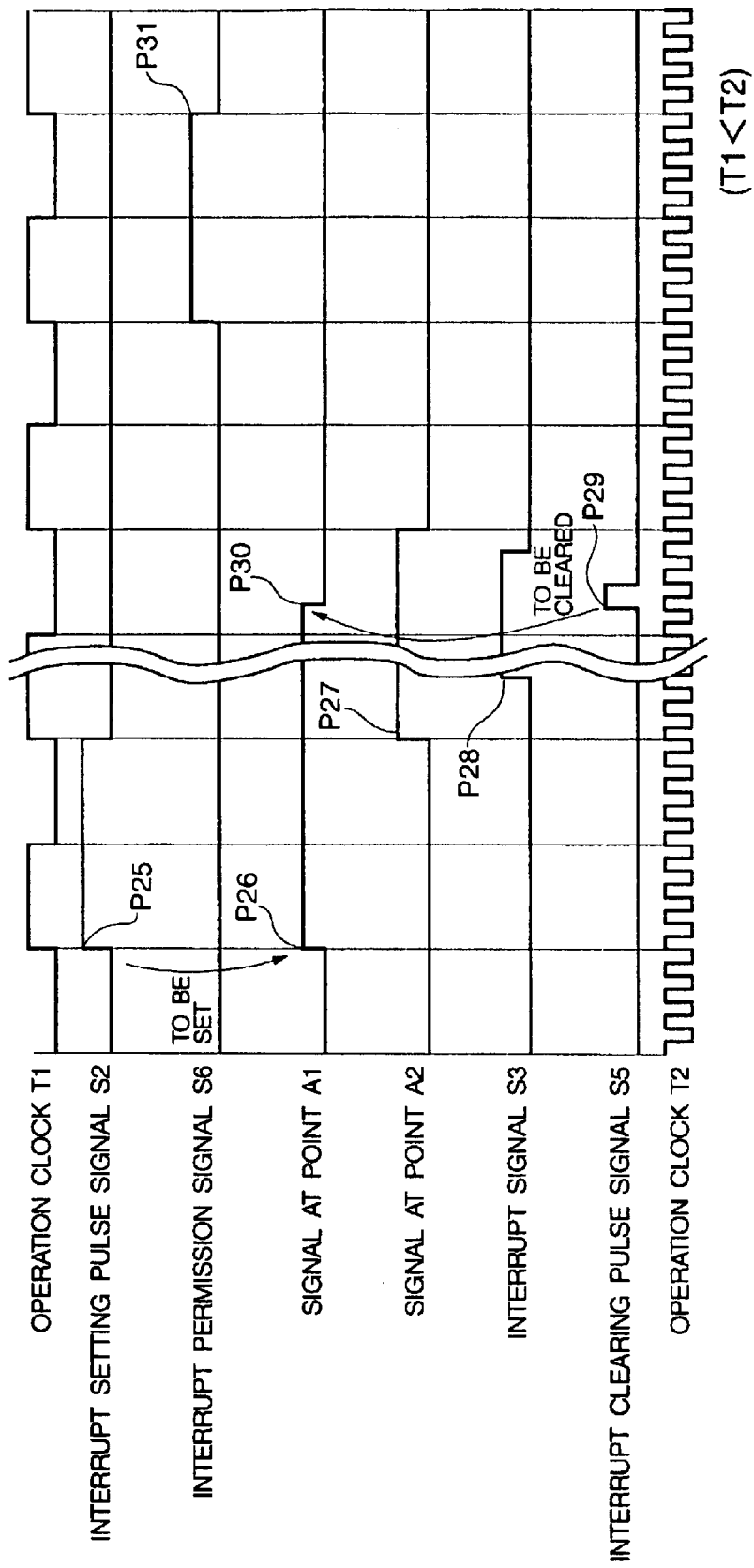
FIG. 6 is a time chart showing operations of the interrupt signal processing apparatus in which the speed of the operation clock for one processing device requiring an interruption is lower than that for the operation clock of the other processing device to be interrupted, according to the second embodiment of the present invention.

FIG. 6 is a time chart showing operations of the interrupt signal processing apparatus 10 of the second embodiment in which a speed of the operation clock T1 for one processing device requiring an interruption is lower than that for the operation clock T2 of the other processing device to be interrupted, according to the second embodiment of the present invention. When the one processing device operating is going to generate an interruption to the other processing device, as is well known, the one processing device, after having confirmed that the interruption is allowed, outputs the interrupt requesting signal S1 having a pulse width being equivalent to that of two clock periods of the operation clock T1, to the interrupt signal processing apparatus 10.

The interrupt setting pulse generating section 11 in the interrupt signal processing apparatus 10, when receiving the interrupt requesting signal S1, as shown in FIG. 6, generates, in response to the interrupt requesting signal S1, the interrupt setting pulse S2 which rises at a time point P25 in synchronization with the clock T1.

When the interrupt setting pulse signal S2 being generated in synchronization with the operation clock T1 and having a width being equivalent to one clock period of the operation clock T1 is input to the set terminal "s" of the register 12, the output of the register 12 rises at a time point P26 shown in FIG. 6. This causes the interrupt signal S3 represented by using positive logic to be substantially stored in the register 12.

The interrupt signal S3, as shown at a time point P27 in FIG. 6, is input with a delay being equivalent to one clock period of the operation clock T2, which is produced by the passage of the interrupt signal S3 through the delay circuit 17, in synchronization with the operation clock T2 for the other processing device, to the first synchronization section 13. In the first synchronization section 13, the interrupt signal S3 with the delay produced by the passage through the delay circuit 17 is further given a time delay being equivalent to two clock periods of the clock T2 as shown at a time point P28 in FIG. 6. This allows the interrupt signal S3 being stable to be output to the other apparatus.

The other processing device, when receiving the interrupt signal S3 fed from the interrupt signal processing apparatus 10, performs processing so as to respond to the request for the interruption from the one processing device.

When this processing has been completed, the other processing device, in order to notify the one processing device that a new interruption is allowed, outputs the interrupt clearing request signal S4 having a pulse width being equivalent to two clock periods of the operation clock T2, to the interrupt signal processing apparatus 10.

The interrupt clearing pulse generating section 14 in the interrupt signal processing apparatus 10, when receiving the interrupt clearing request signal S4, as shown in FIG. 6, generates, in response to the interrupt clearing request signal S4, the interrupt clearing pulse S5 which rises at a time point P29 in synchronization with the clock T2.

When the interrupt clearing pulse signal S5 having a pulse width being equivalent to one clock period of the operation clock T2 is input to the reset terminal "r" of the register 12, as shown by a time point P30 in FIG. 6, an output from the register 12 is reversed. This reversed signal, after passing through the delay circuit 17, is output, as the interrupt permission signal S6, to the second synchronization section 15. The second synchronization section 15 outputs the interrupt permission signal S6 represented by using negative logic, with a delay being equivalent to two clock periods of the operation clock T1, as shown by a time point P31 in FIG. 6, to the one processing device.

The one processing device judges, by its polling operation, whether it has received the interrupt permission signal S6 and, if it has received the interrupt permission signal S6, can confirm that the interruption is allowed in the other processing device.

The delay circuit 17 of the present invention, as shown by a time point P27 in FIG. 6, by using the D flip-flop 31 of the delay circuit, gives a time delay being equivalent to one clock period of the operation clock T1 to the interrupt signal S3. This provides a time delay being equivalent to the time required for the interrupt setting pulse signal S2 to be input to the set terminal "s" of the register 12, to the interrupt signal S3 which is output to the first synchronization circuit 13.

The interrupt signal processing apparatus 10, gives, by using the delay action of the delay circuit 17, the time delay being equivalent to the time required for the interrupt setting pulse signal S2 entering the register 12 to fall, to operations of transmitting the interrupt signal S3 from the first synchronization circuit 13 to the other processing device.

Therefore, even if a new interrupt clearing request signal S4, after the interrupt signal S3 has been transmitted with the above time delay, is output from the other processing device operating on the operation clock T2 having the clock speed being higher than that of the operation clock T1 used in the one processing device to the interrupt signal processing apparatus 10, no simultaneous inputting occurs of a new interrupt clearing pulse signal S5 to be produced by the interrupt clearing pulse generating section 14 based on the new interrupt clearing request signal S4 and of the interrupt setting pulse signal S2 produced on the low-speed operation clock T1, to the register 12.

In the conventional interrupt signal processing apparatus having no delay circuit, when the interrupt clearing request signal S4 is input from the processing device operating on the high-speed operation clock to the processing 20 device operating on the low-speed operation clock, since a new interrupt clearing pulse S5 is generated in response to the interrupt clearing request signal S4 and in synchronization with the high-speed operation clock T2 and since the interrupt request signal S1 fed from the processing device operating on the low-speed operation clock is generated in synchronization with the low-speed operation clock T1, there is a case where the interrupt setting pulse signal S2 and the interrupt clearing pulse signal S5 are input in a duplicated manner to the register 12, thus causing unstable operations of the interrupt signal processing apparatus 10.

Unlike the conventional interrupt signal processing apparatus, according the interrupt signal processing apparatus 10 of the present invention, as described above, since the time delay is provided to the transmission of the interrupt signal S3 by the delay circuit 17 until the interrupt setting pulse signal S2 falls, simultaneous and duplicated inputting of the interrupt clearing pulse signal S5 based on the interrupt clearing request signal S4 fed from the processing device operating on the high-speed operation clock and of the interrupt setting pulse signal S2 based on the interrupt requesting signal S1 fed from the processing device operating on the low-speed operation clock can be prevented, thus making it possible to implement smooth interruptions without causing unstable operations caused by the duplicated inputting.

Therefore, according to the interrupt signal processing apparatus 10 of the present invention, as shown in time charts in FIG. 5 and FIG. 6, regardless of a relation in operation clock speeds between the two processing devices, since the duplicated inputting of the interrupt setting pulse S2 and interrupt clearing pulse S5 to the register 12 can be prevented, an interruption is implemented without considerations given to a difference in the clock speed between two processing devices.

Thus, the interruption can be implemented without taking the relation in the speeds of operation clocks into consideration and without the need for a switching mechanism to switch between the interrupt priority function and the interrupt clearing priority function and without the need for switching operations.

Third Embodiment

Figure 7:
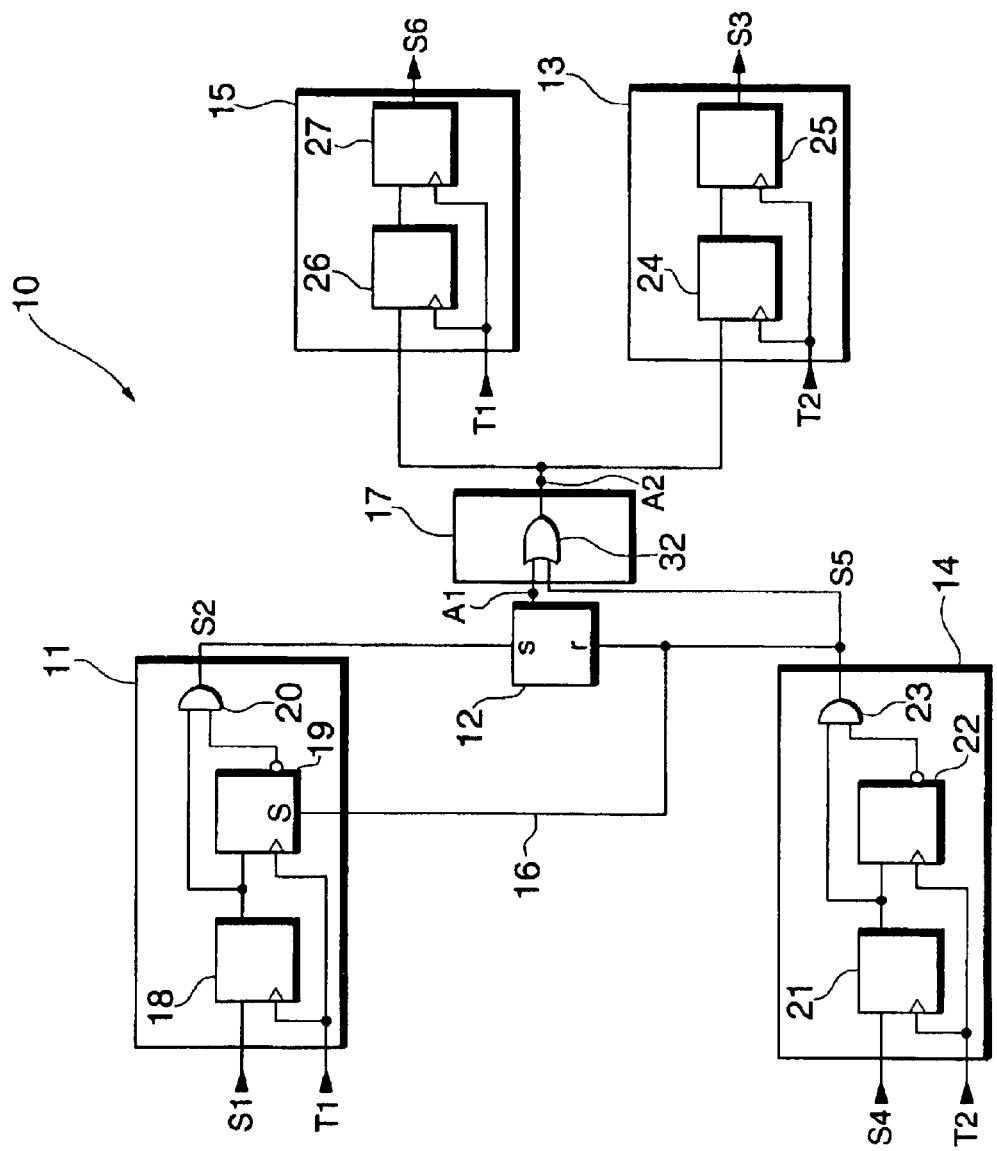
FIG. 7 is a schematic block diagram showing configurations of an interrupt signal processing apparatus according to a third embodiment of the present invention.

Configurations of an interrupt signal processing apparatus 10 of a third embodiment of the present invention as shown in FIG. 7 are basically the same as those in the first embodiment and the second embodiment. The interrupt signal processing apparatus 10 of the third embodiment includes an interrupt setting pulse generating section 11 used to output, when receiving an interrupt requesting signal S1 from one processing device, an interrupt setting pulse signal S2 based on the operation clock T1, on which the one processing device is operated as a reference, a register 12 used to store the interrupt setting pulse S2 as an interrupt signal S3 to the other processing device, a first synchronization section 13 used to output the interrupt signal S3 fed from the register 12, in synchronization with the operation clock T2 used by the other processing device, to the other processing device, an interrupt clearing pulse generating section 14 used to generate, when receiving the interrupt clearing request signal S4 fed from the other processing device, an interrupt clearing pulse signal S5 operating on the operation clock T2 as a reference pulse, on which the other operating device is operated, in order to clear the register 12 and a second synchronization section 15 used to output, when receiving the interrupt clearing pulse signal S5, an interrupt permission signal S6 fed from the register 12, in synchronization with the operation clock T1 used by the one processing device, to the one processing device.

Moreover, the signal processing apparatus 10 of the third embodiment is provided with a control circuit 16 used to control the generation of the interrupt setting pulse S2 by using the interrupt clearing pulse S5 and a delay circuit 17 used to provide a time delay using the timing provided by the interrupt clearing pulse signal S5 to an output of the interrupt permission signal S6 fed from the second synchronization section 15.

The delay circuit 17 shown in FIG. 7 is made up of an OR circuit 32. The OR circuit 32 in the delay circuit 17 receives the interrupt clearing pulse signal S5 to be output from the interrupt clearing pulse generation section 14 through its one input terminal and receives an output from the register 12 through its other input terminal. The output terminal of the OR circuit 32 outputs a signal obtained by ORing the interrupt clearing pulse signal S5 and an output signal fed from the register 12 as an output signal of the delay circuit 17.

The OR circuit 32, when receiving the interrupt signal S3 represented by positive logic from the register 12, generates the interrupt signal S3 represented by positive logic, regardless of a state of the interrupt clearing pulse signal S5 and is output, without a time delay, from its output terminal to the first synchronization section 13. On the other hand, the OR circuit 32, so long as it receives a negative signal from the register 12, when receiving the clearing pulse signal S5 represented by positive logic, outputs a positive logic signal and, when the clearing pulse signal S5 is changed to be a negative logic signal, outputs a negative logic signal, that is, the interrupt permission signal S6. This means that, while the interrupt clearing pulse signal S5 is output from the interrupt clearing pulse generating section 14, the interrupt permission signal S6 represented by negative logic is not output to the second synchronization section 15 through its output terminal. Therefore, the delay circuit 17, when receiving the interrupt permission signal S6, provides a time delay required for the interrupt clearing pulse signal S5 to be output from the interrupt clearing pulse generating section 14 to the interrupt permission signal S6.

Figure 8:
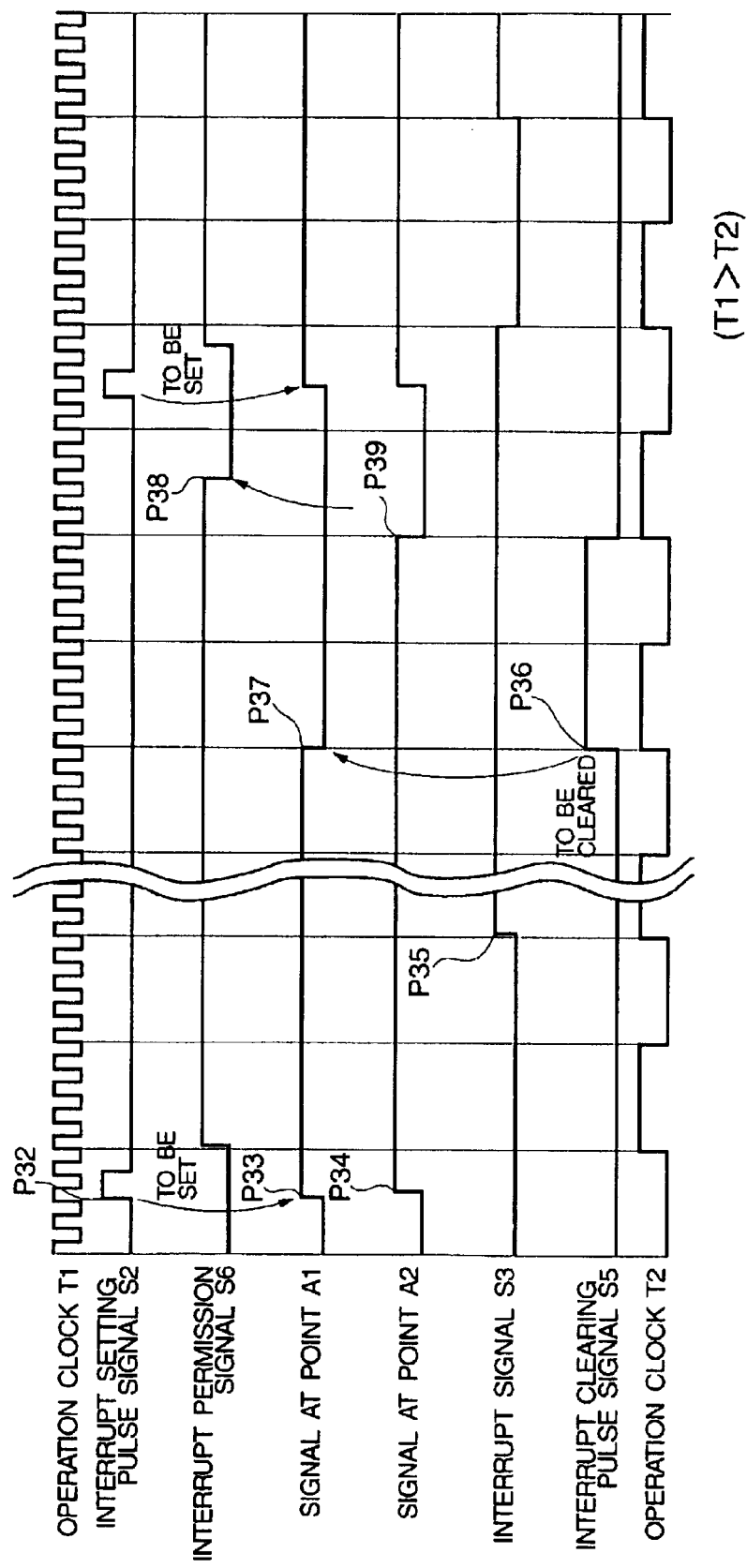
FIG. 8 is a time chart showing operations of the interrupt signal processing apparatus in which a speed of an operation clock for one processing device requiring an interruption is higher than that for an operation clock of the other processing device to be interrupted, according to the third embodiment of the present invention.

FIG. 8 is a time chart showing operations of the interrupt signal processing apparatus in which a speed of the operation clock T1 for one processing device requiring an interruption is higher than that for the operation clock T2 of the other processing device to be interrupted, according to the third embodiment of the present invention.

When the one processing device operating on the high-speed clock is going to generate an interruption to the other processing device operating on the low-speed clock, as is well known, the one processing device, after having confirmed that the interruption is allowed, outputs the interrupt requesting signal S1 having a pulse width being equivalent to two clock periods of the operation clock T1 to the interrupt signal processing apparatus 10. In the interrupt signal processing apparatus 10, the interrupt setting pulse generating section 11, when receiving the interrupt requesting signal S1, in response to this signal S1, generates the interrupt setting pulse signal S2 which rises at a time point P32 in synchronization with the operation clock T1, as shown in FIG. 8.

When the interrupt setting pulse signal S2 being generated in synchronization with the operation clock T1 and having a width being equivalent to one clock period of the operation clock T1 is input to the set terminal "s" of the register 12, the output of the register 12 rises at a time point P33 shown in FIG. 8. This causes the interrupt signal S3 represented by using positive logic to be substantially stored in the register 12.

The interrupt signal S3, as shown by a time point P34 in FIG. 8, is output to the first synchronization section 13, without being delayed by the delay circuit 17.

The first synchronization section 13, when receiving the interrupt signal S3 through the delay circuit 17, as shown by a time point P35 in FIG. 8, provides a delay being equivalent to two clock periods of the operation clock T2 to the interrupt signal S3. This causes the stable interrupt signal S3 to be output to the other device.

The other processing device, when receiving the interrupt signal S3 fed from the interrupt signal processing apparatus 10, performs processing so as to respond to the request for the interruption. When this processing has been completed, the other processing device, in order to notify the one processing device that a new interruption is allowed, outputs the interrupt clearing request signal S4 having a pulse width being equivalent to two clock periods of the operation clock T2, to the interrupt signal processing apparatus 10.

The interrupt clearing pulse generating section 14 in the interrupt signal processing apparatus 10, when receiving the interrupt clearing request signal S4, generates, as shown in FIG. 8, the interrupt clearing pulse signal S5 which rises at a time point P36, in synchronization with the clock T2. The interrupt clearing pulse S5 is output from said interrupt clearing pulse generating section 14 to the register 12, control circuit 16 and delay circuit 17.

When the interrupt clearing pulse signal S5 having a pulse width being equivalent to one clock period of the operation clock T2 is input to the reset terminal "r" of the register 12 in synchronization with the operation clock T2, as shown by a time point P37, an output of the register 12 is reversed. The reversed signal is output as the interrupt permission signal S6 through the delay circuit 17 to the second synchronization section 15. The second synchronization section 15 outputs, with a delay being equivalent to two clock periods of the operation clock T1, the interrupt permission signal S6 represented using negative logic, to the one device, as shown by a time point P38.

The one processing device judges, by its polling operation, whether it has received the interrupt permission signal S6 and, if it has received the interrupt permission signal S6, can confirm that the interruption is allowed in the other processing device.

Moreover, the delay circuit 17 of the present invention, by using the OR circuit 32, as shown by a time point P39, provides a time delay being equivalent to the time required for the interrupt clearing pulse signal S5 to be input to the reset terminal "r" of the register 12, to the interrupt permission signal S6. The interrupt permission signal S6 provided with the time delay is output to the second synchronization section 15.

The interrupt signal processing apparatus 10, provides, by using the delay action of the delay circuit 17, the time delay being equivalent to the time required for the interrupt clearing pulse S2 entering the register 12 to fall, to operations of transmitting the interrupt signal S3 from the second synchronization circuit 15 to the one processing device.

Therefore, even if a new interrupt requesting signal S1, immediately after having confirmed the interrupt permission signal S6 with the above time delay, is output from the one processing device using the operation clock T1 having the clock speed being higher than that of the operation clock T2 used in the other processing device to the interrupt signal processing apparatus 10, no simultaneous inputting occurs of a new interrupt setting pulse signal S2 to be produced by the interrupt setting pulse generating section 11 based on the new interrupt requesting signal S1 and the interrupt clearing pulse signal S5 produced on the low-speed operation clock T2, to the register 12.

In the conventional interrupt signal processing apparatus having no delay circuit 17, when the interrupt requesting signal S1 is output from the processing device using the high-speed operation clock to the processing device using the low-speed operation clock, since a new interrupt setting pulse signal S1 is generated in response to the new interrupt requesting signal S1 and the interrupt clearing request signal S4 fed from the processing device using the low-speed operation clock is produced on the low-speed operation clock T2, duplicate inputting of the interrupt setting pulse signal S2 and the interrupt clearing pulse signal S5 to the register 12 occurs in some cases, thus causing an unstable operation of the interrupt signal processing apparatus.

According to the interrupt signal processing apparatus 10 of the embodiment, as described above, since the delay circuit 17 gives a time delay being equivalent to the time required for the interrupt clearing pulse signal S5 to fall, to the operation of transmitting the interrupt permission signal 6, it is possible to prevent the duplicated inputting of the interrupt setting pulse S2 fed from the processing device operating on the high-speed operation clock in response to the interrupt requesting signal S1 and the interrupt clearing pulse signal S5 based on the interrupt clearing request signal S4 fed from the processing device operating on the low-speed operation clock to the register 12, thus enabling a smooth interruption without causing unstable operations attributable to the duplicated inputting of the both signals.

Figure 9:
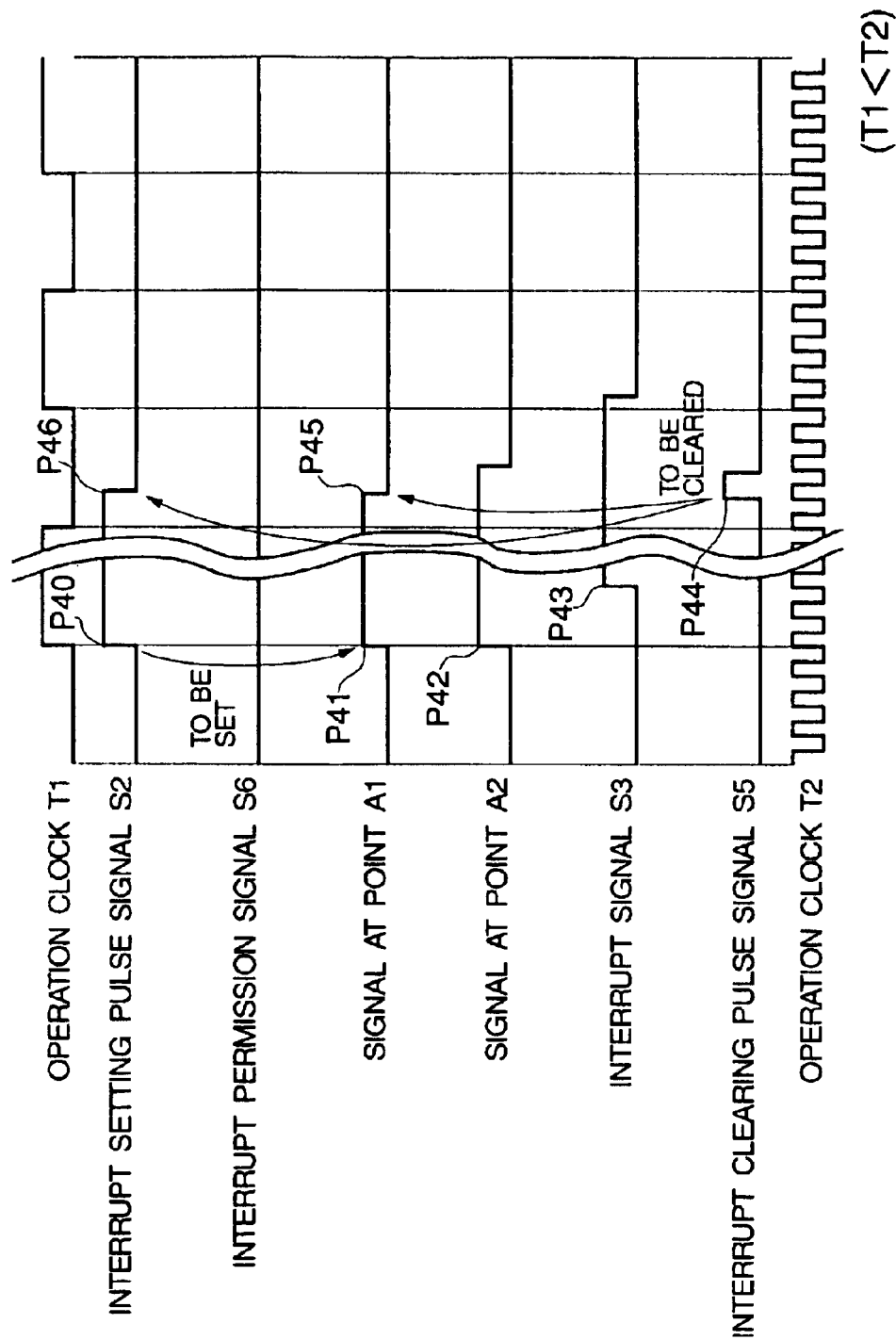
FIG. 9 is a time chart showing operations of the interrupt signal processing apparatus in which the speed of the operation clock for one processing device requiring an interruption is lower than that for the operation clock of the other processing device to be interrupted, according to the third embodiment of the present invention.

FIG. 9 is a time chart showing operations of the interrupt signal processing apparatus in which a speed of the operation clock T1 for the one processing device requiring an interruption is lower than that of the operation clock T2 for the other processing device to be interrupted, according to the third embodiment of the present invention.

When the one processing device using a low clock speed causes the other processing device using a high clock speed to perform interrupt processing, as is conventionally known, the one processing device, after having confirmed that the interruption is allowed, outputs the interrupt requesting signal S1 having a clock pulse width being equivalent to two clock periods of the operation clock T1 to the interrupt signal processing apparatus 10. The interrupt setting pulse generating section 11 in the interrupt signal processing apparatus 10, when receiving the interrupt requesting signal S1, outputs, in response to the interrupt requesting signal S1, the interrupt setting pulse signal S2 which rises as shown by a time point P40 in FIG. 9.

When the interrupt setting pulse signal S2 having a pulse width being equivalent to one clock period of the operation clock T1 is input to the set terminal "s" of the register, an output from the register 12 rises as shown by a time point P41 in FIG. 9. This causes the interrupt signal S3 represented by using positive logic to be stored in the register 12.

The interrupt signal S3, as shown by a time point P42 in FIG. 8, is output to the first synchronization section 13, without being delayed by the delay circuit 17.

The first synchronization section 13, when receiving the interrupt signal S3 through the delay circuit 17, as shown by a time point P43 in FIG. 9, provides a time delay being equivalent to two clock periods of the operation clock T2 to the interrupt signal S3.

The other processing device, when receiving the interrupt signal S3 fed from the interrupt signal processing apparatus 10, performs processing so as to respond to the request for the interruption. When this processing has been completed, the other processing device, in order to notify the one processing device that new interruption is allowed, outputs the interrupt clearing request signal S4 having a pulse width being equivalent to two clock periods of the operation clock T2, to the interrupt signal processing apparatus 10.

The interrupt clearing pulse generating section 14 in the interrupt signal processing apparatus 10, when receiving the interrupt clearing request signal S4, generates, as shown in FIG. 9, the interrupt clearing pulse signal S5 which rises at a time point P44, in synchronization with the clock T2.

When the interrupt clearing pulse signal S5 having a pulse width being equivalent to one clock period of the operation clock T2 is input to the reset terminal "r" of the register 12, as shown by a time point P45, an output of the register 12 is reversed. The reversed signal is output as the interrupt permission signal S6 through the delay circuit 17 to the second synchronization section 15. The second synchronization section 15 outputs, with a time delay being equivalent to two clock periods of the operation clock T1, the interrupt permission signal S6 represented using negative logic, to the one device.

The one processing device judges, by its polling operation, whether it has received the interrupt permission signal S6 and, if it has received the interrupt permission signal S6, can confirm that the interruption is allowed in the other processing device.

The interrupt signal processing apparatus 10 of the embodiment, when receiving the interrupt clearing request signal S4, the interrupt clearing pulse signal S5 produced in synchronization with the high-speed operation clock T2 is input to the reset terminal "r" of the register 12, thereby resetting the register 12.

In the example of the time chart shown in FIG. 9, since the interrupt setting pulse signal S2 is operated in synchronization with the operation clock T1 having a clock speed being lower than that of the operation clock T2 in synchronization with which the interrupt clearing pulse signal S5 is operated, when the interrupt clearing pulse signal S5 resets the register 12, as described above, there is a fear that the interrupt setting pulse signal S2 continues to be input to the set terminal "s" of the register 12, which may cause duplicated inputting to the register 12.

However, as described above, the interrupt setting pulse generating section 11 operating on the low-speed operation clock T1 stops generation of the interrupt setting pulse S2, as shown by a time point P46 in FIG. 9, due to the receipt of the interrupt clearing pulse S5 fed from the interrupt clearing pulse generating section 14 operating on the high-speed operation clock T2.

Thus, the duplicated inputting of the interrupt clearing pulse signal S5 based on the interrupt clearing request signal S4 fed from the processing device operating on the high-speed operation clock and of the interrupt setting pulse signal S2 based on the interrupt requesting signal S1 fed from the processing device operating on the low-speed operation clock, to the register 12 can be prevented, thus enabling a smooth interruption without causing unstable operations attributable to the duplicated inputting of the both signals.

Therefore, according to the interrupt signal processing apparatus 10 of the present invention, as shown in time charts in FIG. 8 and FIG. 9, regardless of a relation in operation clock speeds between the two processing devices, since the duplicated inputting of the interrupt setting pulse S2 and interrupt clearing pulse S5 to the register 12 can be prevented, an interruption is implemented without considerations given to a difference in the clock speed between two processing devices.

Thus, the interruption can be implemented without taking the relation in the speeds of operation clocks into consideration and without the need for a switching mechanism to switch between the interrupt priority function and the interrupt clearing priority function and without the need for switching operations.

Fourth Embodiment

Figure 10:
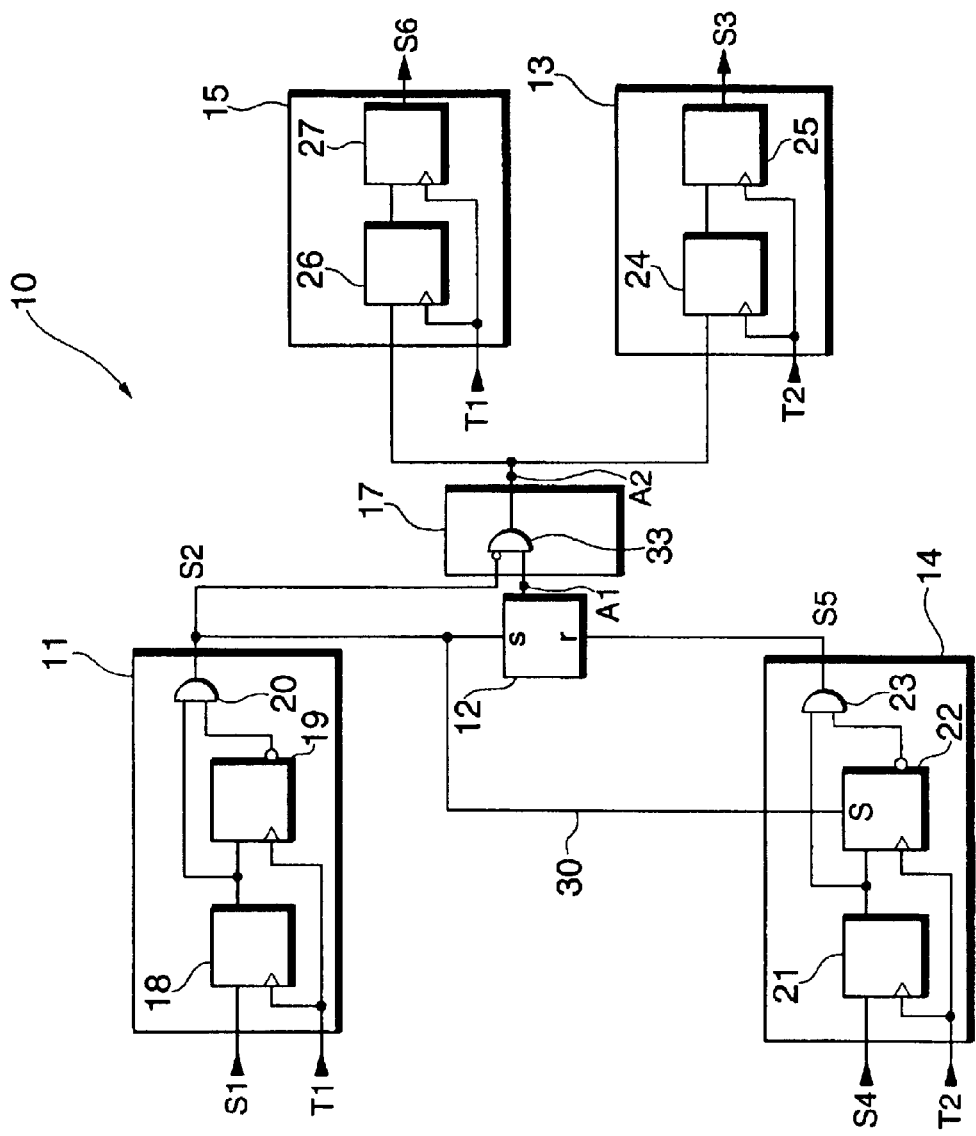
FIG. 10 is a schematic block diagram showing configurations of an interrupt signal processing apparatus according to a fourth embodiment of the present invention.

Configurations of an interrupt signal processing apparatus 10 of a fourth embodiment of the present invention as shown in FIG. 10 are basically the same as those in the first embodiment, the second embodiment and the third embodiment. The interrupt signal processing apparatus 10 of the fourth embodiment includes an interrupt setting pulse generating section 11 used to output, when receiving an interrupt requesting signal S1 from one processing device, an interrupt setting pulse signal S2 using timing provided by the operation clock T1, a register 12 used to store the interrupt setting pulse S2 as an interrupt signal S3 to the other processing device, a first synchronization section 13 used to output the interrupt signal S3 fed from the register 12, in synchronization with the operation clock T2 used by the other processing device, to the other processing device, an interrupt clearing pulse generating section 14 used to generate, when receiving the interrupt clearing request signal S4 fed from the other processing device, an interrupt clearing pulse signal S5 operating using timing provided by the operation clock T2 of the other device, in order to clear the register 12 and a second synchronization section 15 used to output, when receiving the interrupt clearing pulse signal S5, an interrupt permission signal S6 fed from the register 12, in synchronization with the operation clock T1 used by the one processing device, to the one processing device.

Moreover, the signal processing apparatus 10 of the fourth embodiment, as in the case of the second embodiment, is provided with a control circuit 30 used to control the generation of the interrupt clearing pulse signal S5 by using the interrupt setting pulse S2 and a delay circuit 17 used to provide a time delay using timing provided by the interrupt setting pulse signal S2 to an output of the interrupt signal S3 fed from the first synchronization section 13.

The delay circuit 17 shown in FIG. 10, unlike in the case of the embodiment 2, is made up of an AND circuit 33. As the AND circuit 33 of the delay circuit 17, an AND circuit one of both input terminals of which is a reversed input terminal is used. The AND circuit 33 receives the interrupt setting pulse S2 output from the interrupt setting pulse generating circuit 11 through the reversed input terminal being one input terminal of the input terminals and an output signal from the register 12 through a non-reversed input terminal being the other terminal of the input terminals. The AND circuit 33 performs AND calculating processing on a signal obtained by reversing an input signal to the reversed input terminal and on an output signal from the register 12 and outputs the calculation result as an output of the delay circuit 17.

The AND circuit 33, when receiving the interrupt permission signal S6 represented by using logic negative from the register 12, regardless of the state of the interrupt setting pulse, produces a logic result represented by using negative logic and, as a result, the interrupt permission signal S6 represented by using negative logic, without being delayed, is output through its output terminal to the second synchronization section 15.

On the other hand, the AND circuit 33, so long as it receives the interrupt signal S3 represented by using positive logic from the register 12, when receiving the interrupt setting pulse signal S2 represented by using positive logic through the reversed input terminal, outputs a negative logic signal and, when the interrupt setting pulse signal S2 received through the reversed input terminal becomes a negative logic signal, outputs a positive logic signal, that is, the interrupt signal S3.

This means that, while the interrupt setting pulse signal S2 is output from the interrupt setting pulse generating section 11, the interrupt signal S3 represented by positive logic is not output to the second synchronization section 15 through its output terminal. Therefore, the delay circuit 17, when receiving the interrupt signal S3, provides a time delay required for the interrupt setting pulse signal S2 to be output from the interrupt setting pulse generating section 11 to the interrupt permission signal S3.

Figure 11:
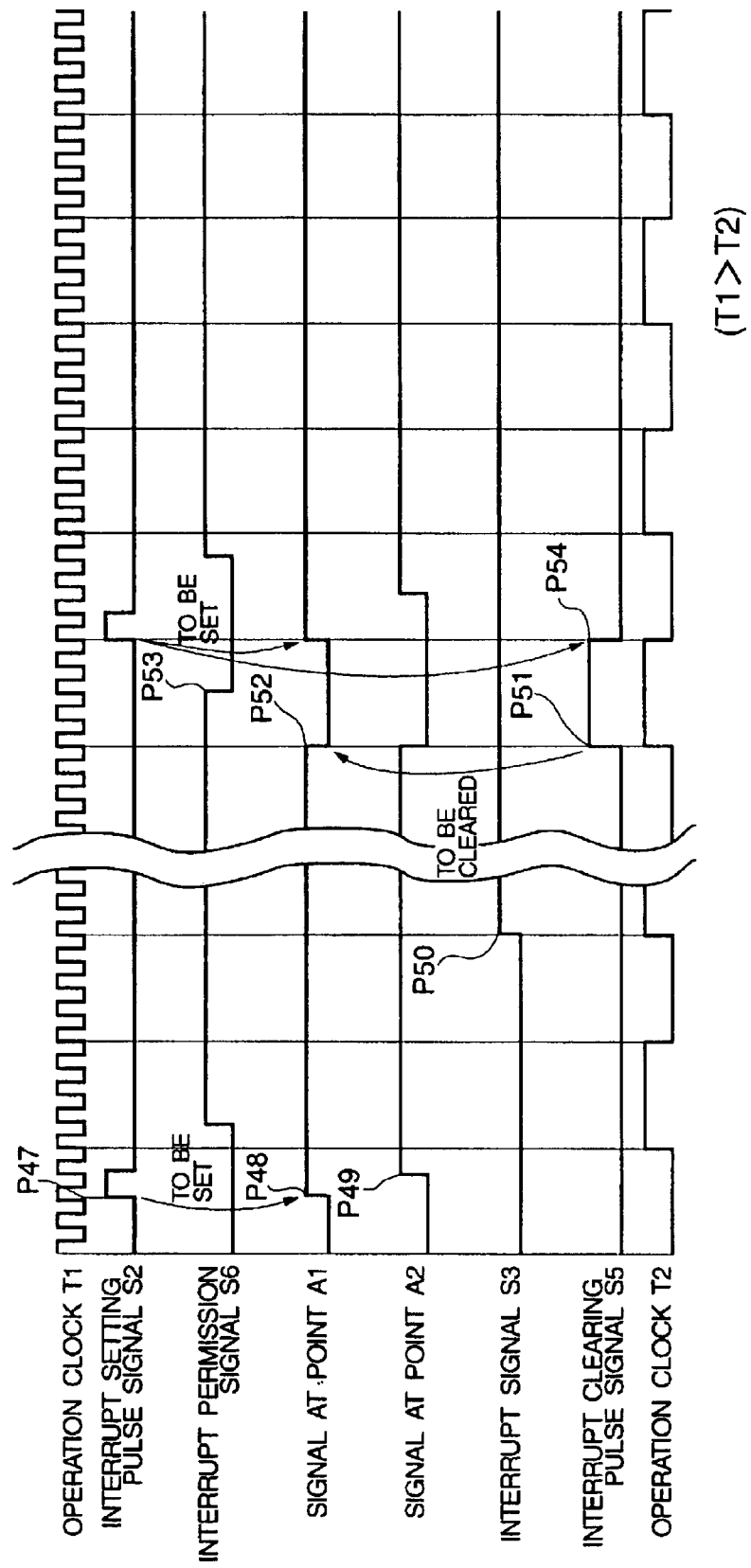
FIG. 11 is a time chart showing operations of the interrupt signal processing apparatus in which a speed of an operation clock for one processing device requiring an interruption is higher than that for an operation clock of the other processing device to be interrupted, according to the fourth embodiment of the present invention.

FIG. 11 is a time chart showing operations of the interrupt signal processing apparatus in which a speed of the operation clock T1 for one processing device requiring an interruption is higher than that for the operation clock T2 of the other processing device to be interrupted, according to the fourth embodiment of the present invention.

When the one processing device operating on the high-speed clock is going to generate an interruption to the other processing device operating on the low-speed clock, as is well known, the one processing device, after having confirmed that the interruption is allowed, outputs the interrupt requesting signal S1 having a pulse width being equivalent to two clock periods of the operation clock T1 to the interrupt signal processing apparatus 10.

In the interrupt signal processing apparatus 10, the interrupt setting pulse generating section 11, when receiving the interrupt requesting signal S1, in response to this signal S1, generates the interrupt setting pulse signal S2 which rises at a time point P47 in synchronization with the operation clock T1, as shown in FIG. 11.

When the interrupt setting pulse signal S2 being generated in synchronization with the operation clock T1 and having a width being equivalent to one clock period of the operation clock T1 is input to the set terminal "s" of the register 12, the output of the register 12 rises at a time point P48 shown in FIG. 11. This causes the interrupt signal S3 represented by using positive logic to be substantially stored in the register 12.

The interrupt signal S3, as shown by a time point P49 in FIG. 11, is delayed by the delay circuit 17 until the interrupt setting pulse signal S2 falls and then is input to the first synchronization section 13.

The first synchronization section 13, when receiving the interrupt signal S3 which has been provided with a delay, as shown by a time point P50 in FIG. 11, provides a delay being equivalent to two clock periods of the clock T2 to the interrupt signal S3.

The other processing device, when receiving the interrupt signal S3 fed from the interrupt signal processing apparatus 10, performs processing so as to respond to the request for the interruption. When this processing has been completed, the other processing device, in order to notify the one processing device that a new interruption is allowed, outputs the interrupt clearing request signal S4 having a pulse width being equivalent to two clock periods of the operation clock T2, to the interrupt signal processing apparatus 10.

The interrupt clearing pulse generating section 14 in the interrupt signal processing apparatus 10, when receiving the interrupt clearing request signal S4, generates, as shown in FIG. 11, the interrupt clearing pulse signal S5 which rises at a point P51, in synchronization with the clock T2.

The interrupt clearing pulse signal S5 having a pulse width being equivalent to the operation clock T2 operating in synchronization with the operation clock T2 is input to the reset terminal "r" of the register 12, as shown by a point P52 in FIG. 11, an output of the register 12 is reversed. The reversed signal is output, as the interrupt permission signal S6, through the delay circuit 17, to the second synchronization section 15. The second synchronization section 15 outputs the interrupt permission signal S6 represented by using negative logic with a delay being equivalent two clock periods of the operation clock T1 to the one processing device, as shown by a time point P53 in FIG. 11.

The one processing device judges, by its polling operation, whether it receives the interrupt permission signal S6 and, if it receives the interrupt permission signal S6, can confirm that the interruption is allowed in the other processing device.

In the interrupt signal processing apparatus 10, when the interrupt clearing request signal S4 is received, the interrupt clearing pulse signal S5 produced in synchronization with the high-speed operation clock T2 is input to the set terminal "s" of the register 12, thereby setting the register 12.

In the example of the time chart shown in FIG. 11, since the interrupt setting pulse signal S2 is operated in synchronization with the operation clock T1 having a clock speed being lower than that of the operation clock T2 in synchronization with which the interrupt clearing pulse signal S5 is operated, when the interrupt clearing pulse signal S5 sets the register 12, as described above, there is a fear that the interrupt setting pulse signal S2 continues to be input to the reset terminal "r" of the register 12, which may cause duplicated inputting to the register 12.

However, as described above, in the interrupt clearing pulse generating section 14 operating on the low-speed clock pulse T2, the generation of the interrupt clearing pulse signal S5 is stopped by the interrupt setting pulse signal S2 fed from the interrupt setting pulse generating section 11 operating on the high-speed clock pulse T1 as shown at a time point P54 in FIG. 11.

Thus, the duplicated inputting of the interrupt setting pulse signal S2 based on the interrupt setting request signal S1 fed from the processing device operating on the high-speed operation clock and of the interrupt clearing pulse signal S5 based on the interrupt clearing request signal S4 fed from the processing device operating on the low-speed operation clock, to the register 12, can be prevented, thus enabling a smooth interruption without causing unstable operations attributable to the duplicated inputting of the both signals.

Figure 12:
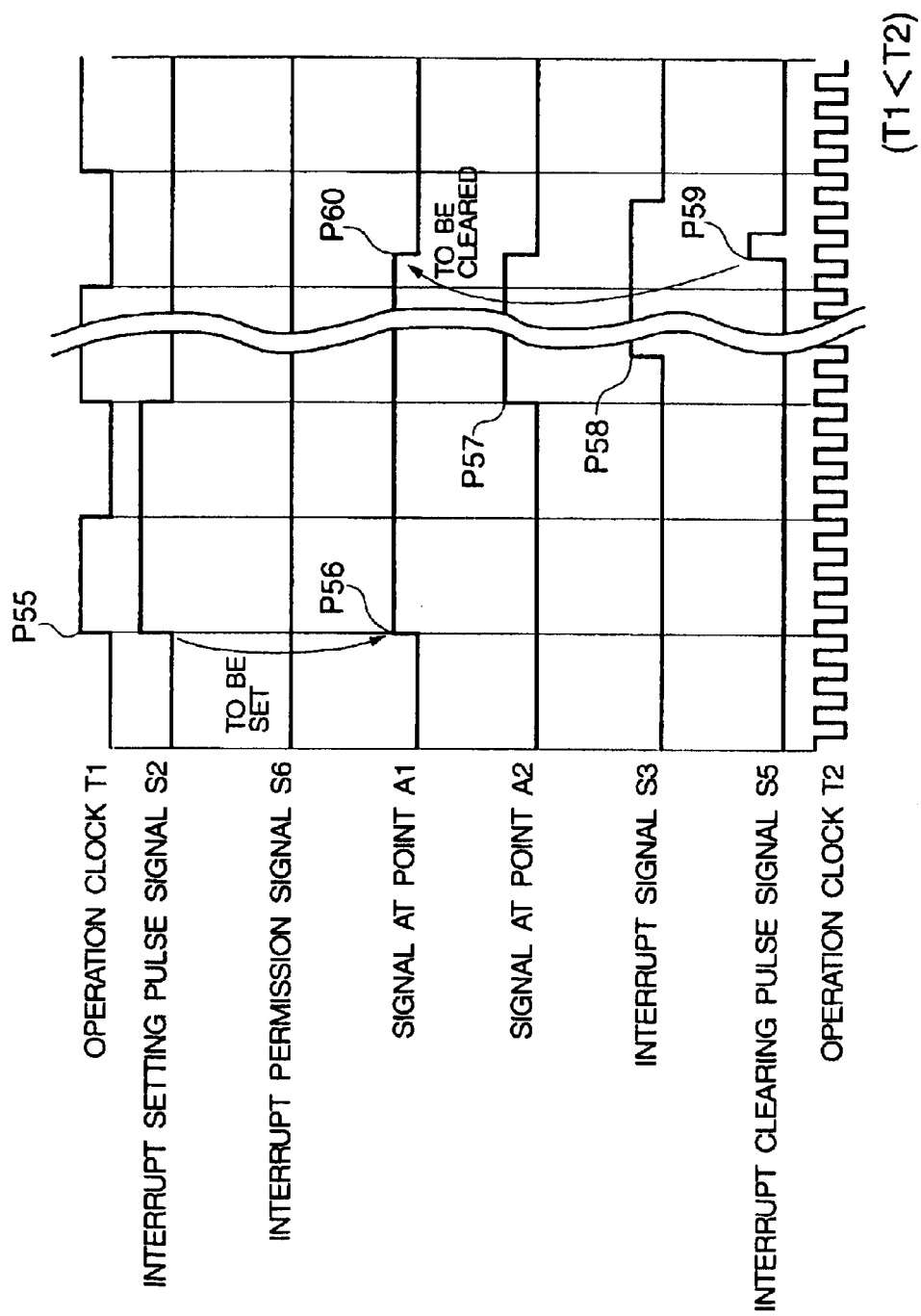
FIG. 12 is a time chart showing operations of the interrupt signal processing apparatus in which the speed of the operation clock for one processing device requiring an interruption is lower than that for the operation clock of the other processing device to be interrupted, according to the fourth embodiment of the present invention.

FIG. 12 is a time chart showing operations of the interrupt signal processing apparatus in which a speed of the operation clock T1 for one processing device requiring the interruption is lower than that for the operation clock T2 of the other processing device to be interrupted, according to the fourth embodiment of the present invention.

When the one processing device causes the other processing device to perform interrupt processing, the one processing device, after having confirmed that the interruption is allowed, outputs the interrupt requesting signal S1 having a clock pulse width being equivalent to two clock periods of the operation clock T to the interrupt signal processing apparatus 10.

The interrupt setting pulse generating section 11 in the interrupt signal processing apparatus 10, when receiving the interrupt requesting signal S1, outputs, in response to the interrupt requesting signal S1 and in synchronization with the operation clock T1, the interrupt setting pulse signal S2 which rises as shown by a time point P55 in FIG. 12. The interrupt setting pulse signal S2 is output from the interrupt setting pulse generating section 11 to the register 12, the control circuit 30 and the delay circuit 17.

When the interrupt setting pulse signal S2 having a pulse width being equivalent to one clock period of the operation clock T1 is input to the set terminal "s" of the register, an output from the register 12 rises as shown by a time point P56 in FIG. 12. This causes the interrupt signal S3 represented by using positive logic to be stored in the register 12 substantially.

The interrupt signal S3 is delayed by the delay circuit 17, as shown by a time point P57 in FIG. 12, until the interrupt setting pulse signal S2 falls, and then is input to the first synchronization section 13. The first synchronization section 13, when receiving the interrupt signal S3 delayed by the delay circuit 17, further delays the interrupt signal S3 by two clock periods of the operation clock T2 as shown by a time point P58 in FIG. 12. This causes stable interrupt signal S3 to be output to the other device.

The other processing device, when receiving the interrupt signal S3 from the interrupt signal processing apparatus 10, performs processing to respond to the interrupt request from the one processing device. After this processing has been completed, the other processing device, in order to notify the one processing device that new interruption is allowed, outputs the interrupt clearing request signal S4 having a pulse width being equivalent to two clock periods of the operation clock T2 to the interrupt signal processing apparatus 10.

The interrupt clearing pulse generating section 14 in the interrupt signal processing apparatus 10, when receiving the interrupt clearing request signal S4, generates, as shown in FIG. 12, the interrupt clearing pulse signal S5 which rises at a time point P59, in synchronization with the clock T2.

The interrupt clearing pulse signal S5 having a pulse width being equivalent to one clock period of the operation clock T2 operating in synchronization with the operation clock T2 is input to the reset terminal "r" of the register 12, as shown by a time point P60 in FIG. 12, an output of the register 12 is reversed. The reversed signal is output, as the interrupt permission signal S6, through the delay circuit 17, to the second synchronization section 15. The second synchronization section 15 outputs the interrupt permission signal S6 represented by using negative logic with a delay being equivalent two clock periods of the operation clock T1 to the one processing device.

The one processing device judges, by its polling operation, whether it receives the interrupt permission signal S6 and, if it receives the interrupt permission signal S6, can confirm that the interruption is allowed in the other processing device.

The delay circuit 17 of the fourth embodiment, by using the AND circuit 33 of the delay circuit, provides a time delay being equivalent to one clock period of the clock T1 to the interrupt signal S3 as shown by a time point P57 in FIG. 12.

This provides a time delay being equivalent to the time required for the interrupt setting pulse signal S2 to be input to the set terminal "s" of the register 12, to the interrupt signal S3 which is output to the first synchronization circuit 13.

The interrupt signal processing apparatus 10, gives, by using the delay action of the delay circuit 17, the time delay being equivalent to the time required for the interrupt setting pulse signal S2 entering the register 12 to fall, to operations of transmitting the interrupt signal S3 from the first synchronization circuit 13 to the other processing device.

Therefore, even if a new interrupt clearing request signal S4, after the interrupt signal S3 has been transmitted with the above time delay, is output from the other processing device operating on the operation clock T2 having the clock speed being higher than that of the operation clock T1 used in the one processing device to the interrupt signal processing apparatus 10, no simultaneous inputting occurs of a new interrupt clearing pulse signal S5 to be produced by the interrupt clearing pulse generating section 14 based on the new interrupt clearing request signal S4 and of the interrupt setting pulse signal S2 produced on the low-speed operation clock T1, to the register 12.

In the conventional interrupt signal processing apparatus having no delay circuit, when the interrupt clearing request signal S4 is input from the processing device operating on the high-speed operation clock to the processing device operating on the low-speed operation clock, since a new interrupt clearing pulse S5 is generated in response to the interrupt clearing request signal S4 and in synchronization with the high-speed operation clock T2 and since the interrupt clearing request signal S4 fed from the processing device operating on the low-speed operation clock is generated in synchronization with the low-speed operation clock T2, there is a case where the interrupt setting pulse signal S2 and the interrupt clearing pulse signal S5 are input in a duplicated manner to the register 12, thus causing unstable operations of the interrupt signal processing apparatus 10.

Unlike the conventional interrupt signal processing apparatus, according the interrupt signal processing apparatus 10 of the present invention, as described above, since the time delay is provided to the transmission of the interrupt signal S3 by the delay circuit 17 until the interrupt setting pulse signal S2 falls, simultaneous and duplicated inputting of the interrupt clearing pulse signal S5 based on the interrupt clearing request signal S4 fed from the processing device operating on the high-speed operation clock and of the interrupt setting pulse signal S2 based on the interrupt requesting signal S1 fed from the processing device operating on the low-speed operation clock can be prevented, thus making it possible to implement a smooth interruption without causing unstable operations caused by the duplicated inputting.

Therefore, according to the interrupt signal processing apparatus 10 of the present invention, as shown in time charts in FIG. 11 and FIG. 12, regardless of a relation in operation clock speeds between the two processing devices, since the duplicated inputting of the interrupt setting pulse S2 and interrupt clearing pulse S5 to the register 12 can be prevented, an interruption is implemented without considerations given to a difference in the clock speed between two processing devices.

Thus, the interruption can be implemented without taking the relation in the speeds of operation clocks into consideration and without the need for a switching mechanism to switch between the interrupt priority function and the interrupt clearing priority function and without the need for switching operations.

According to the interrupt signal processing apparatus of the present invention, as described above, even if the speed of the operation clock on the control side in the control circuit is lower than that of the operation clock on the controlled side, when the interrupt requesting signal or the interrupt clearing request signal is input to the pulse generating section operating on the low-speed clock, since the delay circuit provides a time delay using timing provided by the operation clock on the control side to the interrupt permission signal or the interrupt signal fed from the synchronization section operating on the high-speed operation clock, such conventional malfunctions as described above can be solved.

Thus, according to the present invention, there is no need for providing two types of circuit configurations for the interrupt signal processing apparatus for interruption from one processing device to the other processing device and for interruption from the other processing device to the one processing device. Moreover, since the interruption can be implemented without the need for a switching mechanism to switch between the interrupt priority function and the interrupt clearing priority function and without the need for switching operations, thus making it possible to reduce production costs and the number of components to be managed and to implement economical apparatus.

It is thus apparent that the present invention is not limited to the above embodiments but may be changed and modified without departing from the scope and spirit of the invention.

What is claimed is:

1. An interrupt signal processing apparatus for processing a request for interruption from one device to the other device, connected between the one device and the other device, each being operated on either of a first clock and a second clock, comprising:
   an interrupt setting pulse generating section, when receiving an interrupt requesting signal from said one device, generates an interrupt setting pulse signal by using timing provided by said first clock on which said one device is operated;
   a register, when receiving said interrupt setting pulse signal, to store said interrupt setting pulse signal as a signal for interruption to said other device;
   a first synchronization unit to output said interrupt signal fed from said register to the other device, in synchronization with said second clock on which the other device is operated;
   an interrupt clearing pulse generating section, when receiving an interrupt clearing request signal from said other device which has received said interrupt signal through said synchronization section, to output an interrupt clearing pulse signal using timing provided by said second clock in order to reset said register used to store said interrupt signal;
   a second synchronization section to output an interrupt permission signal, in synchronization with said first clock, to said one device, when said register has received said clearing pulse signal;
   a control circuit provided between said interrupt setting pulse generating section and said interrupt clearing pulse generating section to control generation, using one pulse out of said interrupt setting pulse signal and said interrupt clearing pulse signal, of the other pulse out of said interrupt setting pulse and said interrupt clearing signal; and
   a delay circuit to provide, while said one pulse signal is being input to said register, a time delay to operations of said synchronization section being operated in synchronization with said clock on which said pulse generating section used to generate said other pulse signal is operated, in order to prevent duplicated inputting of said both pulse signals to the register.

2. The interrupt signal processing apparatus according to claim 1, wherein each of said first and second clocks has a different clock speed.

3. The interrupt signal processing apparatus according to claim 2, wherein a speed of said clock on which said pulse generating section to generate said one of said pulse signals is operated is lower than that of said clock on which said pulse generating section to generate said other of said pulse signals is operated and wherein said delay circuit provides a time delay being equivalent to a clock period of said low-speed clock to said synchronization section.

4. The interrupt signal processing apparatus according to claim 2, wherein said register is made up of a flip-flop having a set terminal, a reset terminal and an output terminal in which an output signal is switched between two values by selective inputting of a signal to both terminals and wherein said interrupt setting pulse signal is input to said set terminal and said interrupt clearing pulse is input to said reset terminal and wherein an output signal from said output terminal is input to said both synchronization sections.

5. The interrupt signal processing apparatus according to claim 2, wherein said control circuit, while said interrupt setting pulse signal is being input in said register, controls said interrupt clearing pulse generating section in order to stop generation of said interrupt clearing pulse generating section by said interrupt clearing pulse generating section and wherein said delay circuit, while said interrupt setting pulse signal is outputting from the interrupt setting pulse generating section, provides a time delay to the transmission of said interrupt signal fed from said register to said first synchronization section.

6. The interrupt signal processing apparatus according to claim 2, said control circuit, while said interrupt clearing pulse signal is being input to said register, controls said interrupt setting pulse generating section in order to stop the generation of said interrupt setting pulse signal and wherein said control circuit, while said interrupt clearing pulse signal is outputting from said interrupt clearing pulse generating section, provides a time delay to the transmission of an interrupt permission signal fed from said register to said second synchronization section.

7. The interrupt signal processing apparatus according to claim 5, wherein said delay circuit is made up of a D flip-flop having a clock input terminal, data input terminal and output terminal and wherein said first clock is input to said clock input terminal and said interrupt permission signal fed from said register to said second synchronization section is input and said interrupt permission signal is output to said output terminal in synchronization with operations of said clock terminal.

8. The interrupt signal processing apparatus according to claim 6, wherein said delay circuit is made up of a D flip-flop having a clock input terminal to which said second clock is input, a data input terminal to which said interrupt signal fed from said register to said first synchronization section is input and an output terminal which outputs said interrupt signal in synchronization with operations of said clock terminal and is made up of an OR circuit to which said interrupt signal fed from said output terminal of said D flip-flop and said interrupt permission signal fed from said register are input and wherein an output from said OR circuit is input to said first synchronization section.

9. The interrupt signal processing apparatus according to claim 5, wherein said delay circuit is made up of an AND circuit to which an output signal fed from said register and a reversed signal of said interrupt setting pulse are input and wherein an output of said logical circuit is input to said both synchronization sections.

10. The interrupt signal processing apparatus according to claim 6, wherein said delay circuit is made up of an OR circuit to which an output signal fed from said register and said interrupt clearing pulse are input and wherein an output from said OR circuit is input to said both synchronization sections.

11. The interrupt signal processing apparatus according to claim 2, wherein said interrupt setting pulse generating section is made up of a D first flip-flop having a data input terminal to which said interrupt requesting signal fed from said one device is input, a clock input terminal to which said first clock is input and an output terminal from which said signal is output with a delay being equivalent to one clock period of said first clock in synchronization with said first clock and of a second D flip-flop having a data input terminal to which said signal is input from said output terminal, a clock input terminal to which said first clock is input and an output terminal from which a reversed signal of said signal with a delay being equivalent to one clock period of said first clock is output in synchronization with said clock terminal and of an OR circuit to which said both signals fed from said output terminals of said first and second D flip-flop are input and wherein said AND circuit outputs, in synchronization with said first clock, one pulse with a pulse width being equivalent to one clock period of said first clock, as the interrupt setting pulse signal to said register.

12. The interrupt signal processing apparatus according to claim 11, wherein said second D flip-flop has a set input terminal receiving a control signal from said control circuit and outputs, while receiving said control signal, said reversed signal to said output terminal, which causes said interrupt setting pulse generating section, while receiving said control signal from said control circuit, to stop the outputting of said interrupt setting pulse signal.

13. The interrupt signal processing apparatus according to claim 2, wherein said interrupt clearing pulse generating section is made up of a first D flip-flop having a data input terminal to which said interrupt clearing request signal fed from said other device is input, a clock input terminal to which said second clock is input and an output terminal which outputs said signal with a delay being equivalent to one clock period of said second clock in synchronization with said second clock and of a second D flip-flop having a data input terminal to which said signal fed from said output terminal is input, a clock input terminal to which said second clock is input and an output terminal which outputs a reversed signal of said signal with a delay being equivalent to one clock period of said clock in synchronization with operations of said clock terminal and of an AND circuit to which said both signals fed from said output terminals of said first and second D flip-flop are input, wherein said AND circuit outputs one pulse having a pulse width being equivalent to one clock period of said second clock as said interrupt clearing pulse signal, in synchronization with said second clock, to said register.

14. The interrupt signal processing apparatus according to claim 13, wherein said second D flip-flop has a set input terminal receiving a control signal from said control circuit and outputs, while receiving said control signal, said reversed signal to said output terminal, which causes said interrupt clearing pulse generating section, while receiving said control signal from said control circuit, to stop the outputting of said interrupt clearing pulse signal.

15. The interrupt signal processing apparatus according to claim 2, wherein said first synchronization section is provided with a first D flip-flop having a data input terminal to which said interrupt signal is input from said delay circuit, a clock input terminal to which said second clock is input and an output terminal which outputs said signal with a delay being equivalent to one clock period of said second clock in synchronization with said clock and with a second D flip-flop having a data input terminal to which said signal is input from said output terminal, a clock input terminal to which said clock is input and an output terminal which outputs said signal with a delay being equivalent to one clock period of said second clock in synchronization with said second clock, to said other device.

16. The interrupt signal processing apparatus according to claim 2, wherein said second synchronization section is made up of a first D flip-flop having a data input terminal to which said interrupt permission signal is input from said delay circuit, a clock input terminal to which said first clock is input and an output terminal which outputs said signal with a delay being equivalent to one clock period of said first clock in synchronization with said first clock and of a second D flip-flop having a data input terminal to which said signal is input from said output terminal, a clock input terminal to which said first clock is input and an output terminal which outputs said signal with a delay being equivalent to one clock period of said first clock in synchronization with said first clock, to said one device.

17. An interrupt signal processing apparatus for processing a request for interruption from one device to the other device, connected between the one device and the other device, each being operated on either of a first clock and a second clock, comprising:

an interrupt setting pulse generating section, when receiving an interrupt requesting signal from said one device, generates an interrupt setting pulse signal by using timing provided by said first clock on which said one device is operated;

a register, when receiving said interrupt setting pulse signal, to store said interrupt setting pulse signal as a signal for interruption to said other device;

a first synchronization unit to output said interrupt signal fed from said register to the other device, in synchronization with said second clock on which the other device is operated;

an interrupt clearing pulse generating section, when receiving an interrupt clearing request signal from said other device which has received said interrupt signal through said synchronization section, to output an interrupt clearing pulse signal using timing provided by said second clock in order to reset said register used to store said interrupt signal;

a second synchronization section to output an interrupt permission signal, in synchronization with said first clock, to said one device, when said register has received said clearing pulse signal;

a control circuit provided between said interrupt setting pulse generating section and said interrupt clearing pulse generating section to control generation, using one pulse out of said interrupt setting pulse signal and said interrupt clearing pulse signal, of the other pulse out of said interrupt setting pulse and said interrupt clearing signal; and a delay circuit to provide, while said one pulse signal is being input to said register, a time delay to operations of said synchronization section being operated in synchronization with said clock on which said pulse generating section used to generate said other pulse signal is operated, in order to prevent duplicated inputting of said both pulse signals to the register, wherein each of said first and second clocks has a different clock speed and wherein said control circuit, while said interrupt setting pulse signal is being input in said register, controls said interrupt clearing pulse generating section in order to stop generation of said interrupt clearing pulse generating section by said interrupt clearing pulse generating section and wherein said delay circuit, while said interrupt setting pulse signal is outputting from the interrupt setting pulse generating section, provides a time delay to the transmission of said interrupt signal fed from said register to said first synchronization section.

18. The interrupt signal processing apparatus according to claim 17, wherein said delay circuit is made up of a D flip-flop having a clock input terminal, data input terminal and output terminal and wherein said first clock is input to said clock input terminal and said interrupt permission signal fed from said register to said second synchronization section is input and said interrupt permission signal is output to said output terminal in synchronization with operations of said clock terminal.

19. The interrupt signal processing apparatus according to claim 17, wherein said delay circuit is made up of an AND circuit to which an output signal fed from said register and a reversed signal of said interrupt setting pulse are input and wherein an output of said logical circuit is input to said both synchronization sections.

20. An interrupt signal processing apparatus for processing a request for interruption from one device to the other device, connected between the one device and the other device, each being operated on either of a first clock and a second clock, comprising:

an interrupt setting pulse generating section, when receiving an interrupt requesting signal from said one device, generates an interrupt setting pulse signal by using timing provided by said first clock on which said one device is operated;

a register, when receiving said interrupt setting pulse signal, to store said interrupt setting pulse signal as a signal for interruption to said other device;

a first synchronization unit to output said interrupt signal fed from said register to the other device, in synchronization with said second clock on which the other device is operated;

an interrupt clearing pulse generating section, when receiving an interrupt clearing request signal from said other device which has received said interrupt signal through said synchronization section, to output an interrupt clearing pulse signal using timing provided by said second clock in order to reset said register used to store said interrupt signal;

a second synchronization section to output an interrupt permission signal, in synchronization with said first clock, to said one device, when said register has received said clearing pulse signal;

a control circuit provided between said interrupt setting pulse generating section and said interrupt clearing pulse generating section to control generation, using one pulse out of said interrupt setting pulse signal and said interrupt clearing pulse signal, of the other pulse out of said interrupt setting pulse and said interrupt clearing signal; and a delay circuit to provide, while said one pulse signal is being input to said register, a time delay to operations of said synchronization section being operated in synchronization with said clock on which said pulse generating section used to generate said other pulse signal is operated, in order to prevent duplicated inputting of said both pulse signals to the register, wherein each of said first and second clocks has a different clock speed and wherein said control circuit, while said interrupt clearing pulse signal is being input to said register, controls said interrupt setting pulse generating section in order to stop the generation of said interrupt setting pulse signal and wherein said control circuit, while said interrupt clearing pulse signal is outputting from said interrupt clearing pulse generating section, provides a time delay to the transmission of an interrupt permission signal fed from said register to said second synchronization section.

21. The interrupt signal processing apparatus according to claim 20, wherein said delay circuit is made up of a D flip-flop having a clock input terminal to which said second clock is input, a data input terminal to which said interrupt signal fed from said register to said first synchronization section is input and an output terminal which outputs said interrupt signal in synchronization with operations of said clock terminal and is made up of an OR circuit to which said interrupt signal fed from said output terminal of said D flip-flop and said interrupt permission signal fed from said register are input and wherein an output from said OR circuit is input to said first synchronization section.

22. The interrupt signal processing apparatus according to claim 20, wherein said delay circuit is made up of an OR circuit to which an output signal fed from said register and said interrupt clearing pulse are input and wherein an output from said OR circuit is input to said both synchronization sections.

* * * * *